(12) United States Patent
Varela et al.

(10) Patent No.: US 8,707,179 B2
(45) Date of Patent: Apr. 22, 2014

(54) FRAMELESS VIDEO SYSTEM

(75) Inventors: William A. Varela, Venice, CA (US);
John Bendrick, Belmont, CA (US)

(73) Assignee: Avazap, Inc., Venice, CA (US)

( * ) Notice: Subject to any disclaimer, the term of this patent is extended or adjusted under 35 U.S.C. 154(b) by 438 days.

(21) Appl. No.: 12/890,423

(22) Filed: Sep. 24, 2010

(65) Prior Publication Data
US 2011/0078305 A1    Mar. 31, 2011

Related U.S. Application Data

(60) Provisional application No. 61/245,831, filed on Sep. 25, 2009.

(51) Int. Cl.
*G06F 3/048* (2013.01)

(52) U.S. Cl.
USPC ............................................ 715/706; 715/764

(58) Field of Classification Search
USPC ............................................... 715/764, 706
See application file for complete search history.

(56) References Cited

U.S. PATENT DOCUMENTS

| | | | |
|---|---|---|---|
| 6,305,377 B1 | 10/2001 | Portwood et al. | |
| 6,647,257 B2 | 11/2003 | Owensby | |
| 7,468,729 B1 * | 12/2008 | Levinson | 345/473 |
| 7,522,165 B2 | 4/2009 | Weaver | |
| 7,755,478 B2 | 7/2010 | Niemiec et al. | |
| 7,953,255 B2 * | 5/2011 | Amento et al. | 382/118 |
| 8,154,390 B2 | 4/2012 | Heath et al. | |
| 2001/0016819 A1 | 8/2001 | Kolls | |
| 2002/0128746 A1 * | 9/2002 | Boies et al. | 700/245 |
| 2002/0141476 A1 * | 10/2002 | Varela | 373/92 |
| 2005/0222907 A1 | 10/2005 | Pupo | |
| 2007/0124789 A1 | 5/2007 | Sachson et al. | |
| 2008/0066080 A1 | 3/2008 | Campbell | |
| 2008/0111822 A1 * | 5/2008 | Horowitz et al. | 345/530 |
| 2008/0120558 A1 * | 5/2008 | Nathan et al. | 715/764 |
| 2008/0255874 A1 | 10/2008 | Crooks et al. | |
| 2008/0276279 A1 | 11/2008 | Gossweiler et al. | |
| 2009/0063283 A1 | 3/2009 | Kusumoto et al. | |
| 2009/0125967 A1 | 5/2009 | Perlman et al. | |
| 2009/0144105 A1 * | 6/2009 | Blatchley et al. | 705/7 |
| 2009/0241036 A1 * | 9/2009 | Reisinger | 715/757 |
| 2009/0265245 A1 | 10/2009 | Wright | |
| 2009/0315893 A1 * | 12/2009 | Smith et al. | 345/473 |
| 2010/0211450 A1 | 8/2010 | Landesmann | |
| 2010/0332980 A1 * | 12/2010 | Sun et al. | 715/706 |
| 2011/0078305 A1 * | 3/2011 | Varela | 709/224 |
| 2012/0116798 A1 | 5/2012 | Heath et al. | |

OTHER PUBLICATIONS

International Search Report and Written Opinion dated Nov. 17, 2010, issued in related International Patent Application No. PCT/US2010/050268, filed Sep. 24, 2010.

* cited by examiner

*Primary Examiner* — Lance L Barry
(74) *Attorney, Agent, or Firm* — Kilpatrick Townsend & Stockton LLP

(57) ABSTRACT

A frameless audio/video object (FAVO) that provides information to a user. In one embodiment, the FAVO is interactive, such as having hotspots for allowing a user to select more features or information. The information may be advertising. The user can select a desirable FAVO, such as a favorite celebrity.

14 Claims, 11 Drawing Sheets

Example of an Avazap™: golfer on right end corner

Miley Cyrus as Hannah Montana bursts out promoting her latest song

Example of large format Avazaps™ promoting the Victoria's Secret swimwear line

An example of a two flower Avazaps™

FRAMELESS VIDEO SYSTEM

CROSS-REFERENCES TO RELATED APPLICATIONS

This application claims the benefit of Provisional Application No. 61/245,831, filed Sep. 25, 2009, entitled "Frameless Video System," the disclosure of which is hereby incorporated herein by reference.

BACKGROUND OF THE INVENTION

The present invention relates to frameless videos for delivering information to an end user.

New forms of online videos have recently emerged on the web: frameless videos in which characters appear free from a rectangular border whether inside a web page or on top of the web page, the latter form being known as overlay.

To date, frameless videos have been predominantly limited to a web page within a web browser application, and although these videos appear borderless, they are still part of a bigger frame—the web page window that is contained by the web browser application window. Existing frameless videos within a web page are often ads, such as a car that moves across the page or a pop-up. These can be frustrating to a computer user, since they obscure the page the user is trying to read. Another common form of web page based frameless videos are web page host(s) that attempt to guide and enhance an end users experience within a given web page. Frameless video outside of a webpage and web browser applications also exist. For example, virtuagirl.com provides downloadable video files of models for display on the operating system desktop, outside of a browser or other application.

An example of an interactive advertising system where a user can select the types of ads is set forth in US Published Application No. 20090063283, "System and Method for Consumer-Selected Advertising and Branding in Interactive Media." US Published Application No. 20090144105 shows advertising associated with an avatar in a virtual world. US Published Application No. 20080120558 describes an avatar that can migrate from one virtual environment to another.

Stanford professors Byron Reeves and Clifford Nass, in their compelling study, "The Media Equation How People Treat Computers, Television, and New Media like Real People and Places", have highlighted that people automatically and subconsciously anthropomorphize their computer experience. Modern computers attempt to express complex actions and produce objects that are from the real world. The human brain wants to treat the computer as if it were a type of life form.

BRIEF SUMMARY OF THE INVENTION

The present invention provides a frameless object that provides information to a user. In one embodiment, the object is interactive, whereby the object provides additional information to the user in response to user action. The additional information may be commercial information, such as advertising, or may be non-commercial, such as medical information.

In one embodiment, the frameless object is a frameless video object or a frameless audio/video object (FAVO), The system collects and transmits information about the user's interaction with the FAVO.

In one embodiment, the FAVO can move outside of the display window border of a webpage, web browser application or any other software application running on a given device. The FAVO may be synchronized with a corresponding FAVO on other devices, such as a mobile phone, so that the FAVO appears to move from device to device with the user. Multiple FAVOs may be provided, with interaction between FAVOs. The user can select a desirable FAVO, such as a favorite celebrity.

In one embodiment, the FAVO provides advertising by displaying a product or logo, providing a new type of product placement. Alternately, the FAVO can link to advertising. User interaction with a FAVO can be tracked, Client software tracks user viewing time and interaction with the FAVO, and uploads the information to a system server.

In one embodiment, one or more methods are used to encourage a user to download and use a FAVO. The FAVO can be a favorite celebrity, or an attractive model. The FAVO can provide desired information about the celebrity using the video—with or without audio—of the celebrity herself. Alternatively, the celebrity can provide information about other products or services. In another embodiment, the browser can detect downloaded FAVO(s), and disable ads presented on web pages that otherwise would be provided to the user. This allows the user to not only see just ads of interest, but to reduce the number of unwanted ads. The ads or products displayed with the FAVO could be linked to searches done by the user, thus aiding the searcher in a product or service search.

Referring to FIG. 2A, in one embodiment, the system comprises (i) a remote Data Storage, Delivery and Monitoring System (the DSDMS) (2A#100); and (ii) a Client Module (2A#101) that enables the display of a Frameless Video or stream of Frameless Videos on the operating system display and/or on the display of an application being run by the operating system. The Client Module also comprises software that monitors the device user's interaction with Frameless Video(s) and transmits data representing this interaction back to the remote DSDMS, where the DSDMS stores and organizes this information making it available for report generation according to the desires of interested parties. Depending on the data received regarding a particular user's interaction with the Frameless Video(s), the DSDMS comprises software that can further customize new information that is transmitted back to that user's Client Module, further enhancing the user's interaction with the Frameless Video(s). This reiterative interaction between the Client Module and the DSDMS provides an ongoing unique Frameless Video experience for each device user.

FAVOs are high-definition frameless videos that display objects or people as they appear and sound in the real world; as a result they contribute to humanizing the computing experience. In addition, the FAVOs have the ability to be played outside of the webpage, web browser, and/or application window and are capable of floating on the top layer of the operating system and other application windows allowing them to co-exist as companions to the end-users along with other computer applications. Moreover, the FAVOs are capable of accompanying the end-users for hours, days, or longer, including off-line, hence displaying multiple impressions to the end-users.

The frameless, floating and extended-stay video technology is a new consumer information medium that is more effective and interactive than traditional online videos. In the advertisement market, this present invention expands the capabilities of direct marketing, with the flow of information now being two-way—direct from the advertiser to the consumer and then feedback directly back from the consumer to the advertiser.

Though the FAVO are still confined to the computer screen, they are not bordered by the rectangular "window" that surrounds most forms of software. This provides the illusion that the FAVO resides within the computer itself. The device user has the option of having the FAVO display on top of any software application and the device user can completely control the opacity of the image to make the FAVO less intrusive. This fosters a long-term engagement between the device user and the advertiser's successive marketing campaigns.

DETAILED DESCRIPTION OF THE INVENTION

Figure 1:
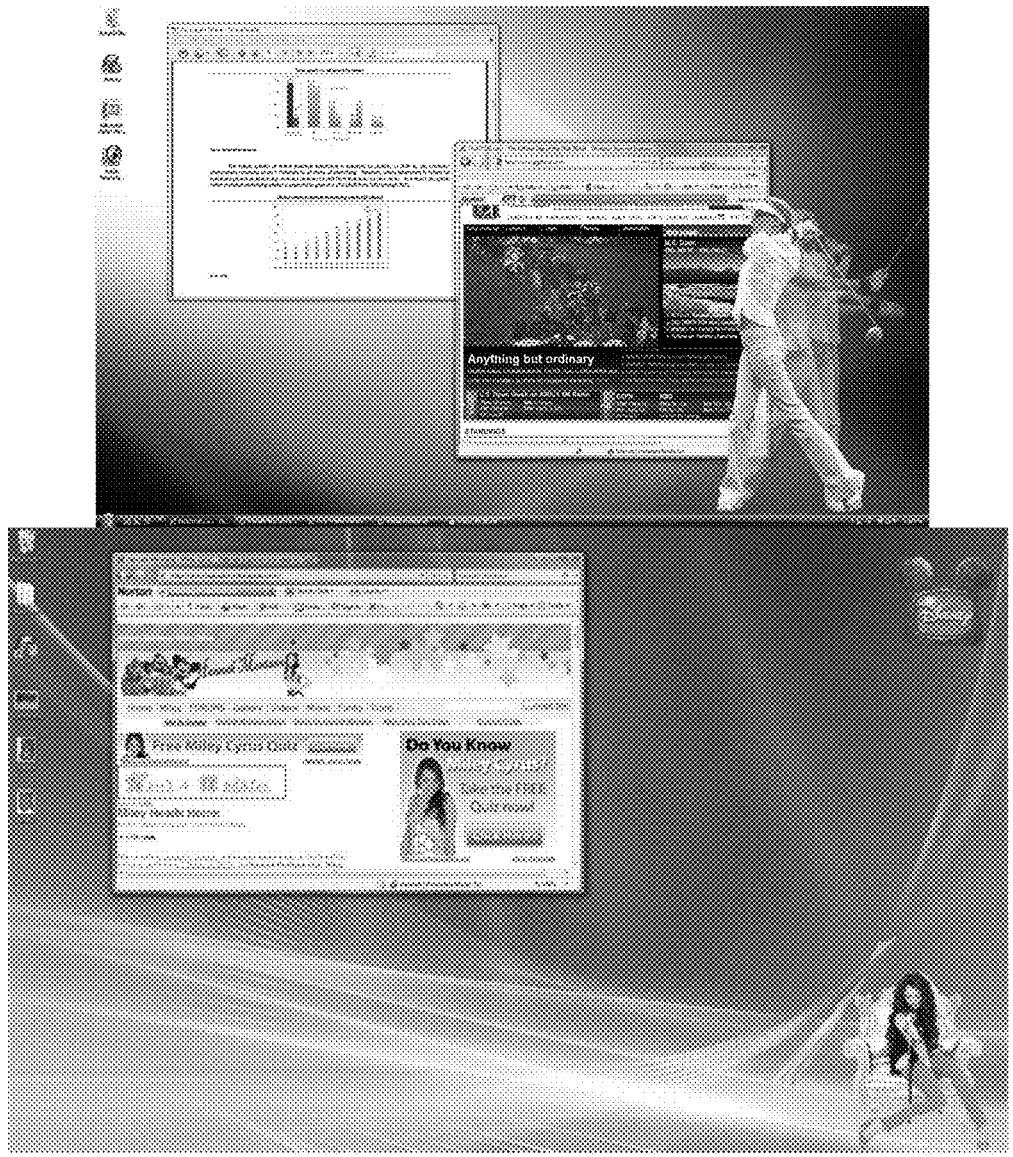
FIG. 1 is an example of a FAVO: golfer on right end corner. The blurred effect represents the manner in which this FAVO moves on the device's screen.

The present invention is directed to high definition frameless videos that are played independent from the display frames of other software applications. FIG. 1 is an example of a FAVO: golfer on right end corner.

The content of the software takes the shape of a windowless and organically-shaped object—generally built from HD filming and 3D development suites—that floats on the operating system desktop display, and optionally on top of the display of other software applications. In FIG. 1, the celebrity in the bottom right corner is a dynamic moving and talking character that simulates real-world life and humanizes the computing experience. With the ability to float on top of other applications, the FAVO can accompany consumers throughout their daily computing activities. These objects can take any shape and run for any duration that a sponsor desires. Generally the FAVO appears as a moving picture/video, but the FAVO may be a static frameless image, series of static frameless images. In this static form the FAVO, end user interaction—such as a mouse click—may cause the FAVO to transform into video mode; thereby bringing the static image "to life".

The visually appealing and interactive nature of the FAVO encourages initial and continued acceptance of the FAVO by the consumers. FAVOs are visually appealing because: (i) they are images of real people they admire or trust or are images of products that they desire; (ii) they are connected to applications that provide information and utility that relates to admired or trusted people or products; (iii) they are completely free; (iv) new and customized content can be delivered to the FAVO to further stimulate the user; and (v) the content delivery is non-intrusive.

The FAVO take advantage of opportunities offered by the recent development of larger and more capable computer screens. As screens have become wider, they leave empty space on the sides of the screen because web pages and most other applications do not fill the entire width of the screen. Microsoft Vista Sidebar is an example of initiatives taking advantage of these empty spaces. In addition, the increase in the number of pixels enables smaller images to look clearer. As a result, the FAVO can reside on end-users' screens while being non-intrusive and realistic. This ongoing trend towards clearer screen images will also allow the FAVO to be visually potent on the small screens of ultra-portable laptops, netbooks, tablets and handsets.

In one embodiment, the user can be redirected to a FAVO website by interacting with advertisements. The website will include optional registration and profile information, and a catalog of FAVOs or FAVO categories for download. Once the user selects a FAVO for download, the Client Module is downloaded or instantiated when the user indicates a desire for a FAVO.

Figure 2A:
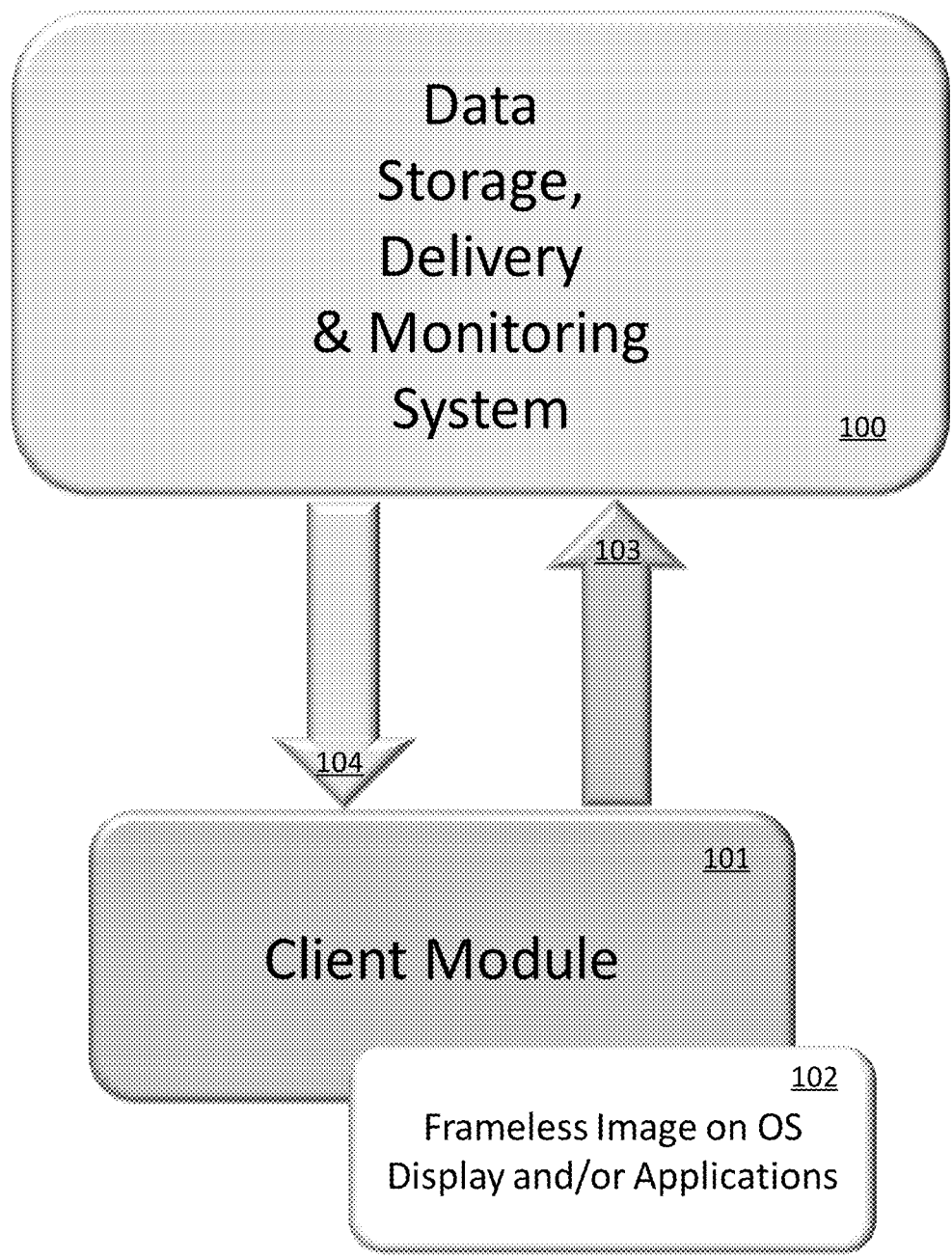
FIGS. 2A, 2B is an example of a basic architecture and components of the system.
Figure 2B:
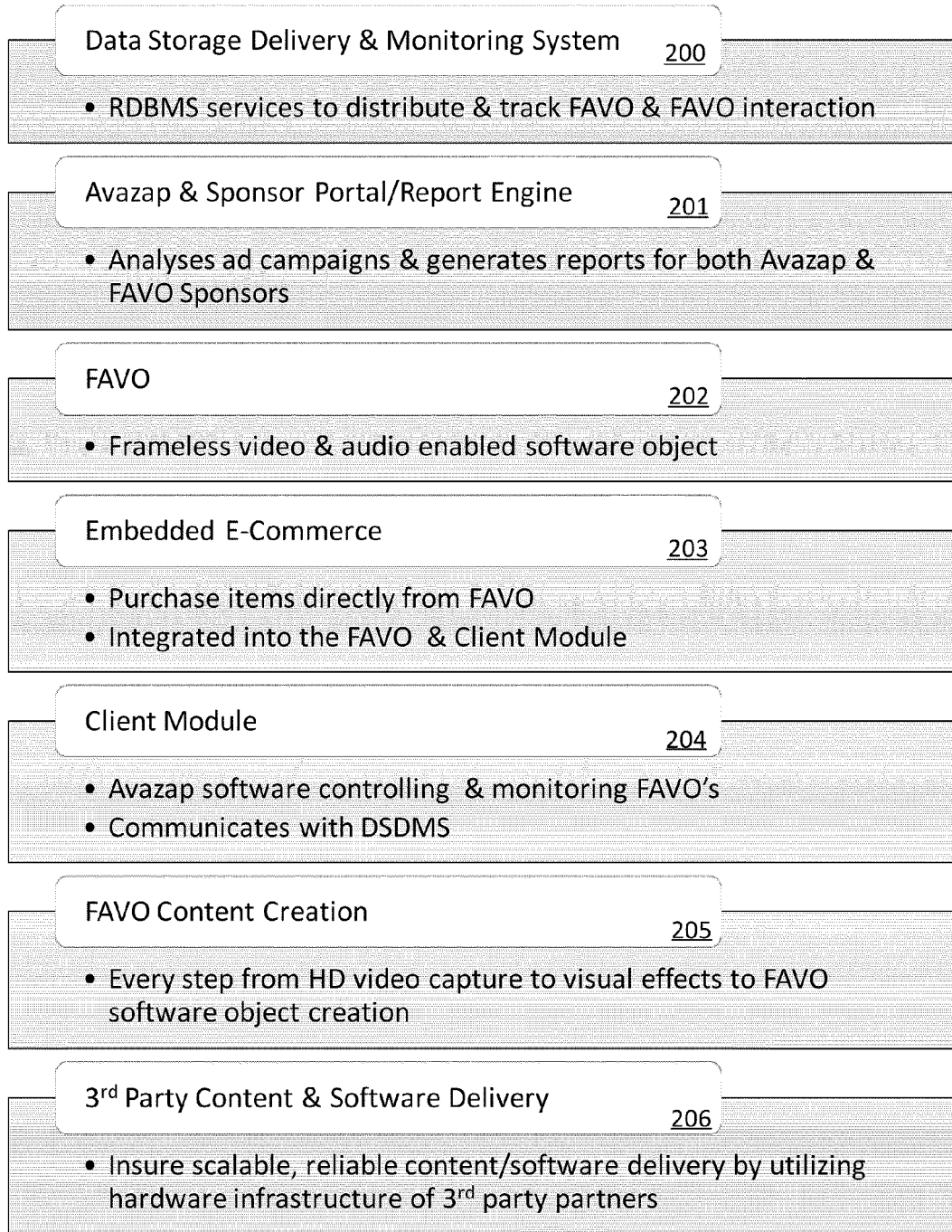

The basic architecture of the system is as set forth in FIGS. 2A-2B.

FAVO FIG. 2B #202

Is a frameless video—audio capable—software object. The FAVO can use Microsoft Agent technology, Microsoft Silverlight, Adobe Air or other technologies. In one embodiment, the FAVO is a windowless form, using COM interop to call Microsoft Agent. In alternate embodiments, different FAVO architectures are provided for different operating systems. To clarify, the frameless video has the ability to float as a separate visual layer on top of the operating system and/or an application display window and the end user can control this 'ability' to set which applications the frameless video will float-on-top of (commonly referred to as setting the Z-order of a software application).

FAVO Client Module FIG. 2B #204

This Client Module is used to communicate with the Data Storage, Delivery & Monitoring System (DSDMS). It uses secure web service calls to upload statistics (such as click-throughs, impressions or time spent viewing FAVOS) to the DSDMS. In one embodiment the Client Module accesses the DSDMS for new versions of the Client Module, as well as for new FAVO'S. It is responsible for requesting new content from the Content Distribution Network. These requests may be end user initiated and/or may be performed at specified periods without end user input; whereas the Client Module automatically polls the DSDMS for new content. The said requested new content may be grouped in packages, such as an update to the Client Module combined with several unique FAVO's and/or a set of unique FAVO's. In this case the Client Module will be able to track & upload statistics to the DSDMS—that go beyond whether the package was simply downloaded—rather detailed data regarding precise end user interaction with each of the items grouped within the package of said items will be tracked and uploaded to the DSDMS. In another embodiment, each item—be it software update or single FAVO—maybe requested and streamed to the Client Module one item at time, whereas the above mentioned tracking and uploading of statistics will apply. The Client Module manages FAVO playback including successive playback of unique FAVO's one after another, and also provides a toolbar tray icon for setting basic options. The Client model may be implemented by various programming strategies: a.) accessing the application programming interfaces that work with a web browser application or embedded as a plug-in to a web browser application, b.) accessed remotely via the internet as software service, c.) embedded within the FAVO software object model as a system of related properties, functions, methods, or other software services, d.) and/or downloaded from the remote DSDMS as a software application that runs on the device's operating system. The said programming strategies may be combined to deliver the optimal implementation of the Client Module.

DSDMS 2B #200

The DSDMS is a set of secured web services and data management systems that are used to store and download information about available FAVOS, Client Module upgrades, sponsor information, end user information, and end user interactions with FAVO's running on their device. It is the DSDMS that houses the information that is needed to generate reports for Avazap, FAVO sponsors and other interested parties. In one embodiment the DSDMS is a relational database management system.

Sponsor Portal & Report Engine 2B #201

The Sponsor Portal is the part of the system that FAVO Sponsors will use to create and monitor ad campaigns, see statistics (such as click throughs and impressions). In one embodiment it is a standard ASP.Net 2.0 Web Application using Telerik RadControls and AJAX to provide an easy to use and responsive User Interface.

FAVO Content Creation 2B #205

Content creation is where the FAVO'S are produced. One created, they are uploaded to the DSDMS and made available for distribution on the Content Delivery System (CDS).

AVAZAP Portal & Report Engine 2B #201

The AVAZAP Portal is the portion of the system used by AVAZAP itself to monitor the system, create and delete FAVO metadata, etc. In one embodiment it is a standard ASP.Net 2.0 Web Application using Telerik RadControls and AJAX to provide an easy to use and responsive User Interface.

Content Delivery System 2B #206

Akamai (or a similar partner) can be used to stage FAVO'S and in one embodiment to download new versions of the Client Module.

Figure 3:
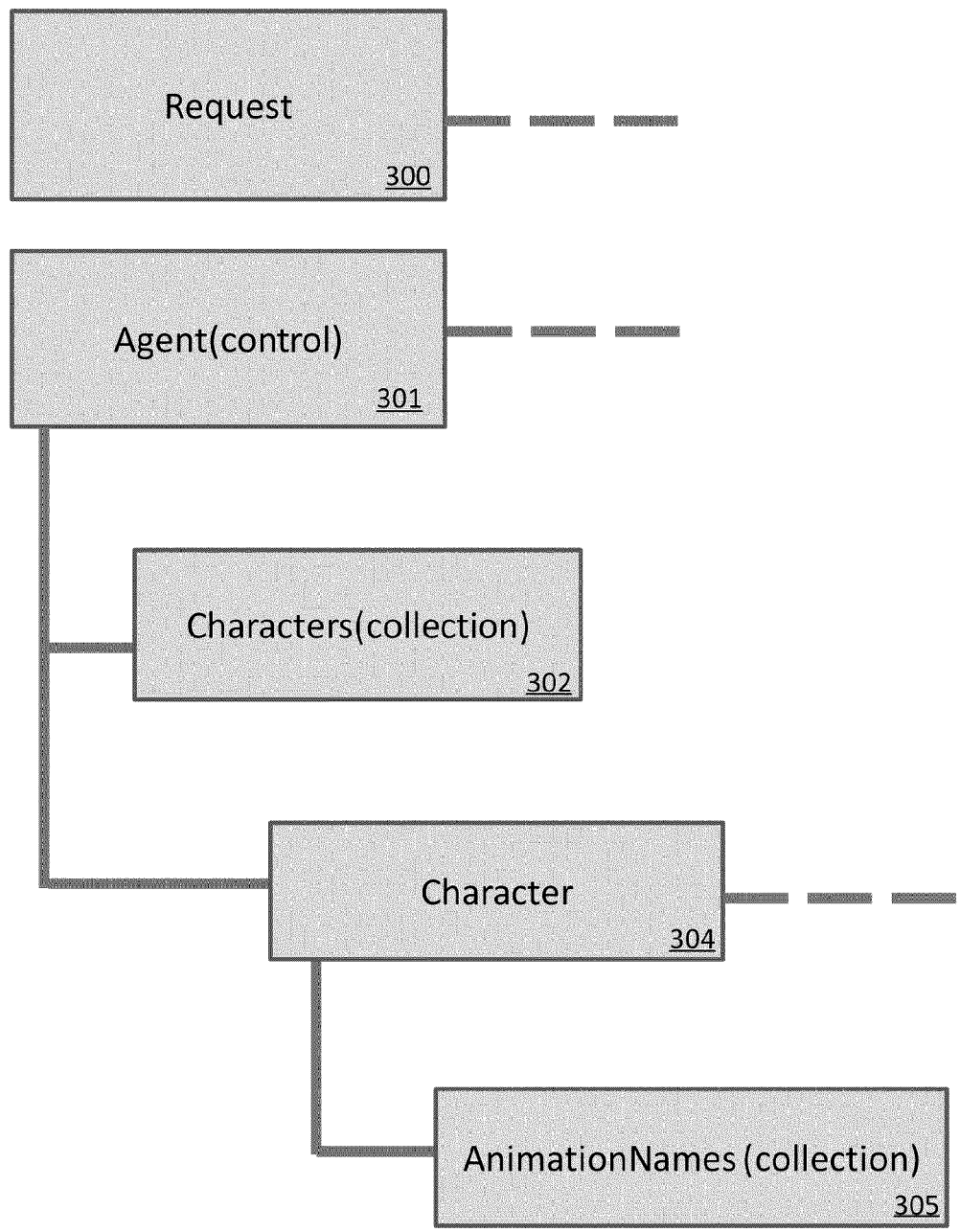
FIG. 3 is a diagram of the hierarchy of objects in Microsoft Agent, used in one embodiment of the invention.

In one embodiment the Client Module software is installed on the user computer. It takes up a small footprint for processing and memory through a number of features, which also provide desired speed. In one embodiment, custom software is used. In another embodiment, the software takes advantage of existing Microsoft agent technology found on most computers. The software interacts with MS Agent software primarily for visual display purposes. The following software object interacts with the Agent Server core component of the Windows operating system via the MS Agent API. This module can control any MS Agent objects created. These objects have the file extension .ACS or .ACF. The following subset of the Microsoft Agent Object Model objects are used:

- Request FIG. 3 #300—used to sync the FAVOs with each other and software application events
- Agent (control) FIG. 3 #301—this contains the other objects
- Characters (collection) FIG. 3 #302—contains the Character object so is used by default
- Character FIG. 3 #303—this contains the properties, methods, and events that give programmatic control to the MS Agent based FAVO. Such as: size(Width, Height), name(String), show( ) play( ) on MouseClick, on Show.
- AnimationNames FIG. 3 #304—this contains the list of the names various unique FAVO'S contained within a given character. This provides the ability to access and control multiple FAVO's embedded within a single object. This useful capability may or may not be included in implementations of FAVO's that do not utilize the MS Agent software services These objects are organized in the following hierarchy shown in FIG. 3. Objects in FIG. 3 (The dotted line following an object indicates that multiple objects can exist.)

Instead of an end user going to a web site—such as YouTube.com—and downloading video files, in one implementation an ID number of the FAVO or FAVO category that has already been downloaded is stored by the Client Module. The DSDMS uses these ID numbers to determine what content to stream to the Client Module. This cross referencing of ID numbers insures that the Client Module only requests FAVO's that have not been downloaded while providing the DSDMS the data to control the FAVO inventory residing on any given end users system. The Client Module has the ability to display a FAVO on the end users device display based upon activation events. The user can either select an activation schedule or triggers, or manually activate a FAVO. A possible default would activate the FAVO whenever the web browser application is active. In one embodiment a FAVO is launched based on an end user search query, the content of said FAVO would relate to the string in the search query, said FAVO would appear on top of the display frame of application that contains search query box. In one embodiment the Client Module tracks end user search query input using that information to launch a search-relevant FAVO. This is accomplished by end user keystroke mapping of edit boxes designed for search query input, and then, comparing that input to a look-up table containing FAVO's with descriptive tagging information. If the said descriptive information matches the search query input then the FAVO's are displayed. In one embodiment this code is embedded into a search enabled website—such as www.Google.com. In another embodiment key mapping is initiated by the Client Module if a given website (or search enabled application such as a toolbar that has a search query input field) appears in a look up table of search enabled websites or search enabled applications.

A FAVO supports alpha channels. An alpha channel is a portion of each pixel's data that is reserved for transparency information. 32-bit graphics systems contain four channels—three 8-bit channels for red, green, and blue (RGB) and one 8-bit alpha channel. The alpha channel is really a mask—it specifies how the pixel's colors should be merged with another pixel when the two are overlaid, one on top of the other.

An alpha channel can be defined on a pixel-by-pixel basis or per object. Different parts of the object would have different levels of transparency depending on how much background is desired to show through. For example, the green screen portions of an image can let everything else on the display show through, creating the appearance of only the FAVO being over the rest of the display.

Various embodiments of the invention may use different formats, such as .PNG, .MNG or GIF In the case of .GIF, alpha channels are not supported.

Multiple FAVO modes are possible, and can be user definable. The FAVO can simply show products or logos on the FAVO, with the products being clothes with logos, or an article held by the FAVO (e.g., golf club). Alternately, backgrounds or other FAVOs can display other products or services.

The Client Module monitors the time a FAVO is active, and which products or logos are displayed, including the time period for each. Any user interaction, such as clicking on a FAVO, is recorded, including what part of the FAVO where that produces a different result. An example of a software module for monitoring user interactions is Google's Gmail, which reads the text of email which was entered via a keystroke EUI (End User Interaction) and then offers relevant ads based on the context of your emails. This EUI data is provided in batches to the DSDMS to avoid overloading the DSDMS. Alternately, real time or increased frequency batch uploading can be used. The information can be directed to advertising customers, or used by the DSDMS, to refine FAVO presented. For example, if a user clicks on a model's shoes, other shoes can be displayed since the user has shown a real time interest in shoes.

Additionally, in one embodiment the software monitors other user activity while the FAVO is active, such as browsing, calendar viewing, etc. A FAVO is activated based upon what web page an end user visits, particular FAVO are mapped to a web page or website address and are launched by the Client Module whenever an end user visits said web address. An embodiment uniquely goes beyond the confines of a single web page—prior FAVO solutions exists only within the display frame of a single web page—and allows for a consistent uninterrupted FAVO experience throughout multiple web pages within a given website. In one embodiment this is accomplished by keeping track of the root and sub-directories of a web site. An embodiment has the FAVO to a.) stop persisting and to shut down after a web site has been left by the end user, OR b.) persist for a set time period after the web site has been left by the end user, OR c.) persist until an EUI turns off the display of the FAVO.

In one embodiment, user selection of a FAVO can be encouraged by limiting other ads provided to the user. For example, if the user selects a Harry Potter FAVO, a browser can detect this, and stop the display of a Harry Potter movie trailer that would otherwise appear on a web page. This would be done by storing a cookie on the user machine with a FAVO ID code. The cookie would be read by the browser, which would correlate it with a table indicating which ads are otherwise to be displayed. If the cookie corresponds to an ad, the ad will not be displayed. This allows advertisers to both achieve more targeted advertising and provide a perceived benefit to the user. Also, ads for other movie types could be inhibited, or the same genre targeted, since the user desires are now known.

The end-user will be able to manage the properties and settings of how FAVOs play and exist on his or her system. The end-user will be able to control the deletion, frequency of play, order of play-by creating play lists (a common feature in applications such as ITunes and Windows Media Player), position on the screen, opacity level, number, size and volume of the FAVO.

Interacting with a FAVO can initiate any programmable action such as launching a relevant page on the clients' website. For instance, if a FAVO is a fashion model a web page could be launched that has information regarding the items—or items that are similar to—the items that the fashion model FAVO is wearing, utilizing and/or gesturing towards. This is useful to the customers as the FAVO is driving traffic to their existing web pages.

At certain key points in a FAVO, the video is mapped to include multiple end user interact-able hotspots. The hotspots are mapped as follows in one embodiment. The FAVO is launched and then the user clicks a freeze frame button during a portion of the FAVO content that lends itself to a key interaction point. For example, if a model was walking from a far point in 3D space towards the end user, as the model gets closer it appears to be larger. Once the model reaches its largest/closet point the user would hit the freeze frame button.

The mapping software—via tracking end user interactions—provides data for the screen coordinates, the display frame dimensions, and the exact pixel that was interacted with in the display frame. The software designer decides what types of logical regions exist within the image. These regions can be anything on the FAVO. Customers will choose what the regions will consist of. Here's a list of possible items that a fashion merchant might want to hot spot on their FAVOs: Head, shoes, shirt, bracelet, etc.

The software designer clicks on each corner of the region to identify the pixel data for each of the four corners of this region. The designer then enters this data into the source code in order to launch a programmatic event based on a EUI. This is repeated for each region of the FAVO that should be mapped out as a hotspot. The process is automated in the following areas:

1. Automatic code generation based on the four corner region method above.
2. Free-form shape region tracing—similar to the lasso technique in Adobe Photo Shop—also backed up with automatic code generation
3. Region tracking algorithms that will allow accurate tracking throughout all frames of the FAVO content. In one embodiment, this is based on color range tracking. This tracking requires FAVO content to be parsed into a smaller number of frames to insure accuracy.

In one embodiment the code is stored in the FAVO object itself. In one embodiment, a 'Hot Spot List' property contains all the hotspots regions for a given FAVO. In another embodiment the Client Module queries a look-up table containing hotspot region data for the various FAVO's.

As an example, the end-user can click on the model's shoe in a FAVO and the clients' web page for the shoe would be launched, or can click on her blouse and the blouse web page would appear. As a result, an advertiser can advertise multiple products and services on one single FAVO. Hot spots can also be used to control the actions of the FAVO or to generate more scenes. This provides a more interactive experience than traditional videos. Rather than simply playing a video, the technology leverages the power of the computer to control playback and establish meaningful viewer interaction, as well as deliver images in an innovative frameless fashion.

In one embodiment, dynamic positioning of the logical regions does not require an end user to have to freeze the FAVO playback in order to have the hotspots work accurately. For example, the area surrounding the FAVO is a hotspot in one embodiment. Visible and invisible areas surrounding FAVO can be hotspots. Hotspots can be trigger scenes. For example, a scene can appear that asks if you want to purchase and item (yes/no/tell me more). The FAVO can trigger the appearance of purchasable items, which separately are hotspots. The EUI generates separate FAVO(S).

The Technology

In addition to the FAVO, the technology is composed of three other software objects that interact with each other:

Client Module, in one embodiment resides on the end-users' systems. The Client Module receives the FAVO's from the DSDMS via a third-party content delivery partner. The Client Module interacts with the end-users and controls and runs the FAVO's. The Client Module also logs impressions, clicks and time spent, and sends this information to the DSDMS.

Figure 4:
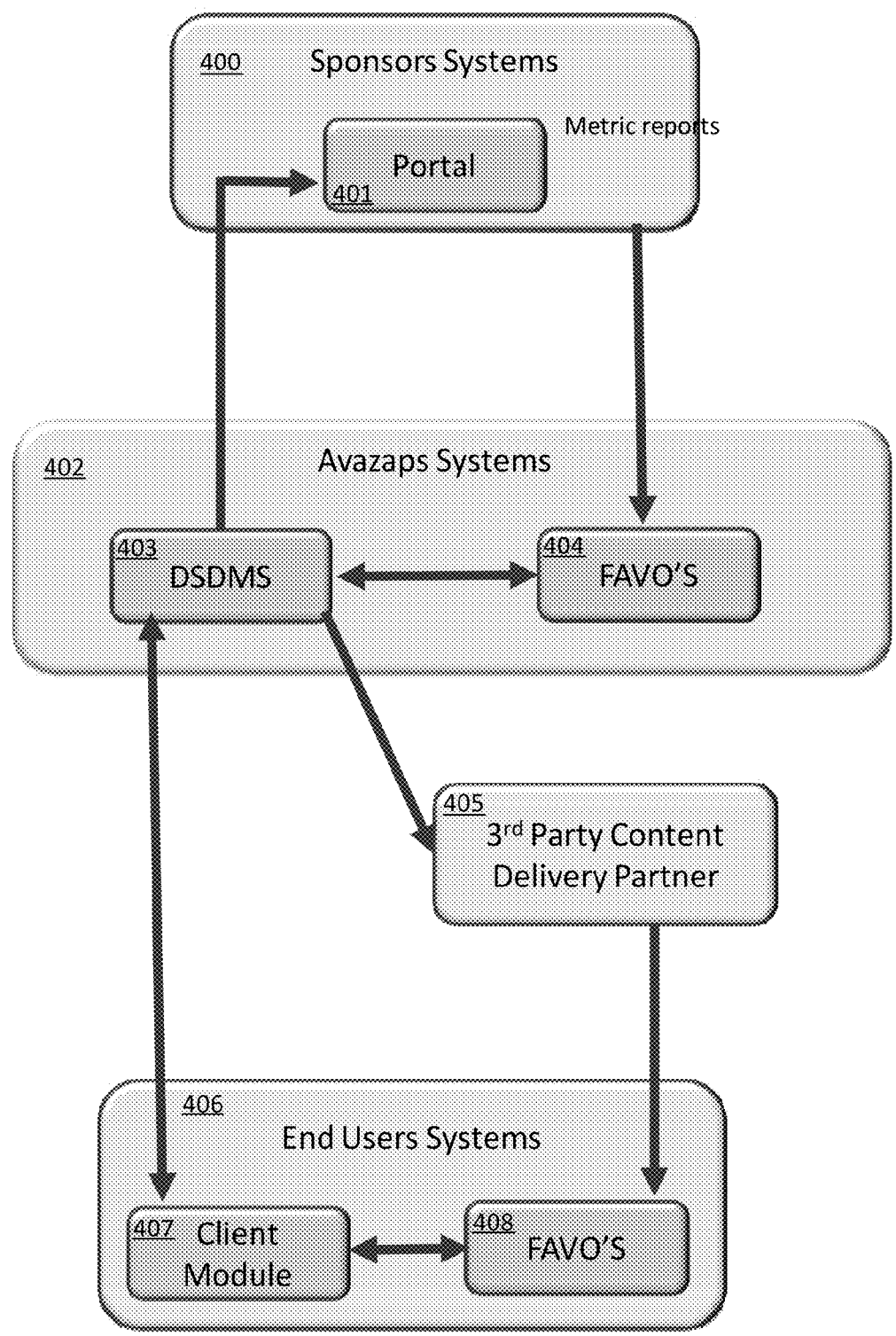
FIG. 4 is an example of software location and interaction.

The DSDMS, which resides in the systems. The DSDMS is a software engine that connects and controls the various interlocking pieces of a FAVO ad campaign. To that effect, the DSDMS encompasses server components and a relational data base system that supports distribution of the ad campaign. The DSDMS delivers the FAVO to the end-users through a third-party content delivery partner to ensure scalability and reliability. The DSDMS also communicates with the Client Module and tracks and records the actions and time spent by the end-users with the clients' ad initiatives. Finally, the DSDMS generates ad metrics reports to the Avazap/Sponsor portals. The DSDMS and the Client Module form a two way conversation.
1. To insure reliable content and software update delivery the DSDMS will utilize a third party content delivery network to facilitate the transfer of content and software updates to the Client Module.
2. The Client Module has various properties that are cached on the end user device and then uploaded to the DSDMS. These are small bits of information and are directly uploaded to the DSDMS. Other small data pieces or commands will travel from the DSDMS directly to the Client Module Avazap/Sponsor Portals, are web based software services. The portals contain a reporting tool that monitors all aspects of the life cycle of the sponsors' ad campaigns and provides the sponsor with live and detailed reports of end-user activity. The portal is a web based form/tool that allows Avazap and its' customers/FAVO sponsors to track the activity of their FAVO initiatives. There are tabs on the form that address the following sponsor concerns:
  Impression reports
    Total impressions by client
    Impressions by FAVO
    Impressions by campaign
    Impressions by timeframe
    Impressions by location/region/demographics
    Impression by scene
  User reports
  Revenue reports
  Customer reports
  Customer data reports
  Campaign reports
  Custom-tailored report generating tools for both AVAZAP and Customers.
  Real time graphic campaign and customer report visualization tools.
  These will allow customers a real time, visual view campaigns, users and FAVOs across the globe.
Metrics
  Impressions—generally looked at an advertising view from which bill based on a negotiated CPM rate
  EUI
    Click rates
    interaction time
      This includes time where the end user is actively engaged with the FAVO.
        Such moving it around on the screen or changing the FAVO's frequency of appearance.
  E-commerce data
    Identifies which FAVO generated the purchase
  End user demographics
  Client Module settings
  Auction bidding and monitoring
  These metrics will grow/adapt based on client feedback
Merchant/Customer Portal Usage Example:
  The portal provides a software tool to empower the relationship between account manager and customer liaison
  As a web based tool the portal is accessible via a computer and/or a mobile device
  By simply logging on—with password verification—the liaison will be able to have an instant snapshot regarding the state of their FAVO initiative
In one embodiment FIG. 4 is an example of software location and interaction wherein a relational database system stores, delivers and monitors data in communication with a.) client software on an end user device, b.) FAVO information stored on Customer device, c.) $3^{rd}$ party content delivery networks, and d.) Web based portals for report generation.

FIG. 4 #400 Sponsors Systems are the devices—such as personal computers or handheld mobiles—that the Customers use to access digital information. FAVO information will be downloaded to the Avazap Systems FIG. 4 #401 Portal is the part of the system that Customers will use to create and monitor ad campaigns, see statistics (click throughs and impressions). In one embodiment it will be a standard ASP.Net 2.0 Web Application using Telerik RadControls and AJAX to provide an easy to use and responsive User Interface.

FIG. 4 #402 Avazaps systems are the various devices and systems used by Avazap to monitor the system, create and delete FAVO and FAVO scene metadata, etc. In one embodiment it will be a standard ASP.Net 2.0 Web Application using Telerik RadControls and AJAX to provide an easy to use and responsive User Interface.

FIG. 4 #403. In one embodiment the DSDMS contains two database servers. The main database server and the secondary database server will be quad core or dual core Intel machines, running Windows Server 2003 and SQL Server 2005. The Primary database will accept incoming statistics from desktop Client Modules, and log them to tables. These tables are then replicated to the secondary server, which does the main processing of statistics. This allows the Primary database server to be optimized for OLTP (Online Transaction Processing), enabling millions of statistics to be recorded 24/7. The Primary database server will also host Avazap Systems and Portal databases. The secondary database server will be used to aggregate and process statistics, and will be configured for OLAP (online analytical processing) usage, with indexes optimized for queries. We will use SQL Server Database Mirroring to have a hot backup of the Primary Database, should it fail. We will user SQL Server Continuous Replication to transfer uploaded statistics to the secondary server, where they can be aggregated and processed without slowing down the processing of incoming data. The statistics from the desktop clients on impressions and click throughs will be aggregated into OLAP cubes using Microsoft Analysis Services, along with statistics on clients (IP addresses that can be converted into geographical locations with geocoding techniques, stats on Operating Systems etc.). These cubes will be available for use on the Avazap Systems and Portals to be able to pivot and analyze both FAVO and system usage.

FIG. 4 #404 The FAVO'S are all of the FAVO'S from all of the Customers. They reside on the Avazaps Systems. In one embodiment, we may implement the FAVO's using the same Microsoft Agent technology as in the prototype. In other embodiments we my implement the FAVO's using Microsoft Silverlight, Windows Presentation Foundation and/or Adobe Air during the initial design phase of the project.

FIG. 4 #405 $3^{rd}$ Party Content Delivery Partner: Akamai (or a similar partner) will be used to stage and download FAVO's and new versions of the Client Module.

FIG. 4 #406 End Users Systems are the devices—such as personal computers or handheld mobiles—that the End Users use to access digital information. FAVO & Client Module information will be downloaded to the Avazap Systems from the $3^{rd}$ Party Content Delivery Partner.

FIG. 4 #407 Client Module will render the actual FAVO's on the End Users Systems, and will also provide a toolbar tray icon for setting basic options. In one embodiment, the visual component of the Client Modules will be a C# .NET 2.0 windowless form, using COM interop to call Microsoft Agent. In other embodiments we will create different players for different operating systems to achieve the highest possible level of End User experience. There will be non-visual components of the Client Module. The module will run on each desktop and be used to communicate with the DSDMS. It will use secure web service calls to upload statistics (click throughs, impressions) to the DSDMS via a Client Module service system. It will also use the Client Module service system to check for new versions of the Client Module, as well as for new FAVO'S. It will be responsible for downloading new content from the 3$^{rd}$ Party Content Delivery Partner. In one embodiment this will be a .NET 2.0 c# application. The Client Module service system is a set of secured web services that are used by the Client Module to upload statistics and download information about available FAVO's and Client Module upgrades.

FIG. 4 #408 The FAVO'S are all of the FAVO'S on the End Users Systems. In one embodiment, we may implement the FAVO's using the same Microsoft Agent technology as in the prototype. In other embodiments we my implement the FAVO's using Microsoft Silverlight, Windows Presentation Foundation and/or Adobe Air during the initial design phase of the project.

The FAVO and the Client Module use minimal space on end-user hard drives: in one embodiment less than 1 MB for the Player and 2 to 4 MB for each FAVO depending on their duration, although varying sizes could be used. In one embodiment this space requirement is based on the average FAVO requiring 8 MB per minute of content. A temporary cache is used for streaming purposes. In one embodiment the FAVOs will reside on the hard drive of the device for the life-cycle of the FAVO campaign. Large FAVOs can be parsed into smaller frame segments to manage streaming or other software issues.

In addition, running a FAVO campaign has very little impact on end-users' computer performance and leaves plenty of computational capacity for an end-user to run multiple applications. The end-user can have a single FAVO running at a time, or can run of multiple FAVO while concurrently running multiple applications, which requires more CPU time.

In one embodiment the system leverages existing functionalities of end-users' systems. Multiple versions of the Client Module are provided for each different operating system. The Client Modules leverage the code libraries of different operating systems. For example, the proprietary code base will be built on top of the proven Microsoft Windows Application Programming Interface.

The Software's Interaction with End-Users and Clients

In one embodiment the Client Module is first installed by the end-user on his or her system after responding positively to a solicitation to view the FAVO. This solicitation can be initiated by various means:

Advertiser's emails to the consumer, including HTML empowered emails that display FAVO;
Click-button on advertiser's website;
Web-linked ads on third-party website, which can either be traditional or video banners or web browser formatted FAVO;
Forward by existing end-users to friends, as each FAVO will have a "send-to-friend" option; and
Free CD/DVDs distributed with magazines, attached to other merchandise, or handed out in public events. Any other portable media, such as flash drives, could be used.

The installation of the Client Module is designed to be light and quick and as user-friendly as updating Adobe's Flash Player, if not more so.

An ad campaign may contain any number of scenes/FAVOs as the end-user will enjoy the experience with more content. An individual FAVO can contain several imbedded scenes. Each FAVO consists of short (e.g., 15 to 30-second) scenes that blend advertising and entertainment. Once the end-user opts-in to receive the campaign, the FAVOs transparently stream to his system. These scenes are played in sequence and then randomly whenever the end-user activates the FAVO. The Client module tracks the number of times a given scene is played, which enables metric reports that clearly distinguish the first viewing of a FAVO from subsequent repeat viewings. This capability allows the customer to value—and to be charged different rates for—the initial viewing versus repeat subsequent viewings of each given FAVO; and to gauge the end user acceptance of a given FAVO based on the number of viewings of said given FAVO.

In one embodiment the Client Module will reside on the end-user's system even after the end of a campaign. At any time, the Client Module can receive new campaign materials from the same advertiser and offer them to the end-users who would have opted-in for it. The system can track and question end-users on their scope of interest and judiciously solicit them to receive targeted campaigns from new advertisers. The resulting database can be used for existing and new customers to target new consumers.

In one embodiment the FAVOs are saved on the end-user's system, ensuring an extended-stay of the ads. If the content is compelling, i.e. visually entertaining and the utility solid, the end-user will allow several replays of each FAVO, ensuring multiple impressions. This effect is multiplied if the end-user activates the companion mode where the FAVO floats on top of other applications. In one embodiment the end user can tag a given FAVO as favorable which would cause it to replay more often than other FAVO's or tag a given FAVO as unfavorable which would remove the FAVO list of FAVO's to be played in the future.

Figure 5:
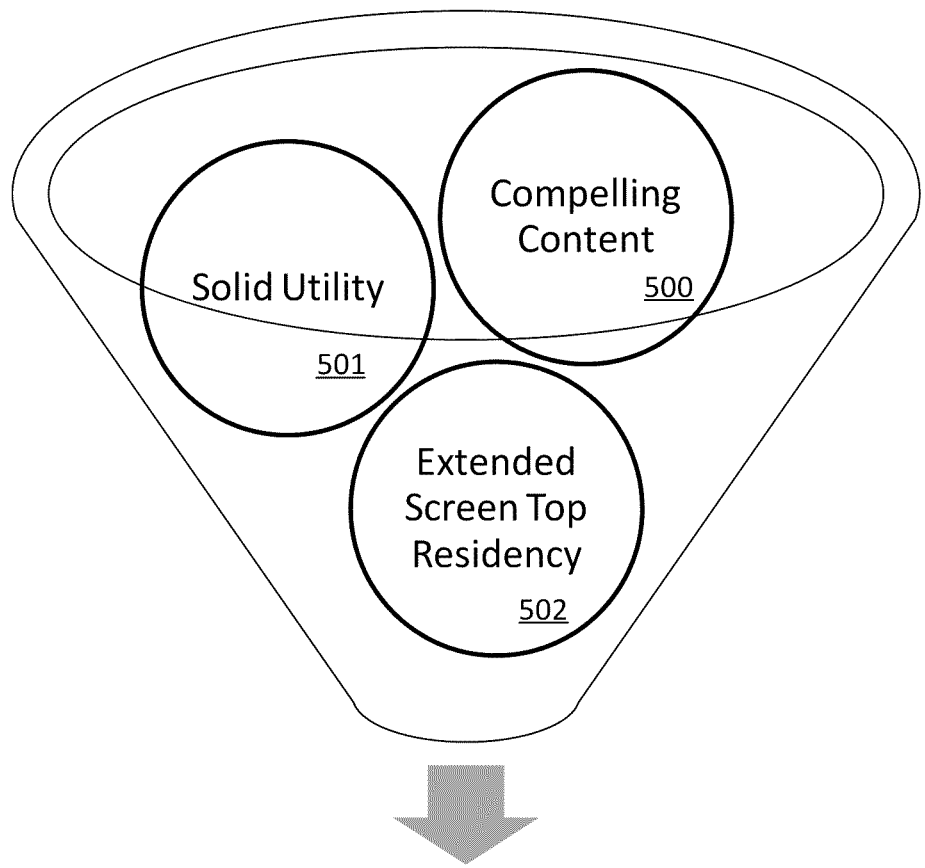
FIG. 5 is an example of multiple impression solution.

FIG. 5 is an example of multiple impression solution. As an example, if we assume that the sponsor is a fashion retailer, the FAVO may consist of models wearing multiple outfits walking up and down a virtual runway. The number of scenes and impressions could easily reach into the hundreds. The models represent the "compelling content" FIG. 5 #500; the ability to directly purchase what each model is wearing demonstrates the "solid utility" FIG. 5 #501; those factors promote the "extended screen top residency" FIG. 5 # 502 and result in "multiple impressions per end-user, per ad campaign" FIG. 5 #503.

It is desirable to make the FAVOs enjoyable, entertaining and interactive in order for the consumers to opt-in to the marketing campaign.

Content Creation

The audio-visual content is prepared in a manner similar to producing TV commercials. Scenes are shot in front of green screen in order to create flawless frameless videos.

Figure 6:
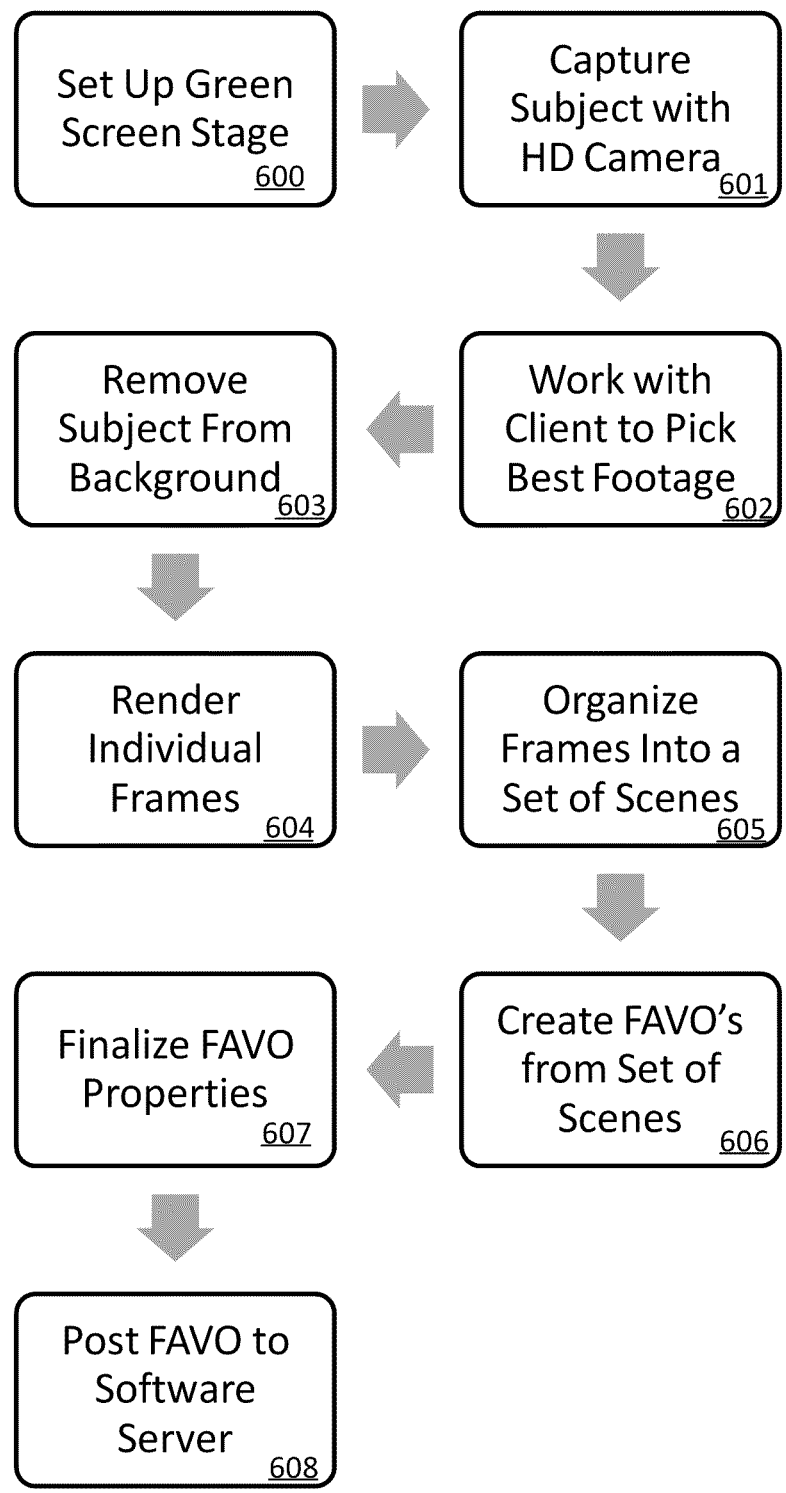
FIG. 6 is an example of a flow chart of the production process.
Figure 7:
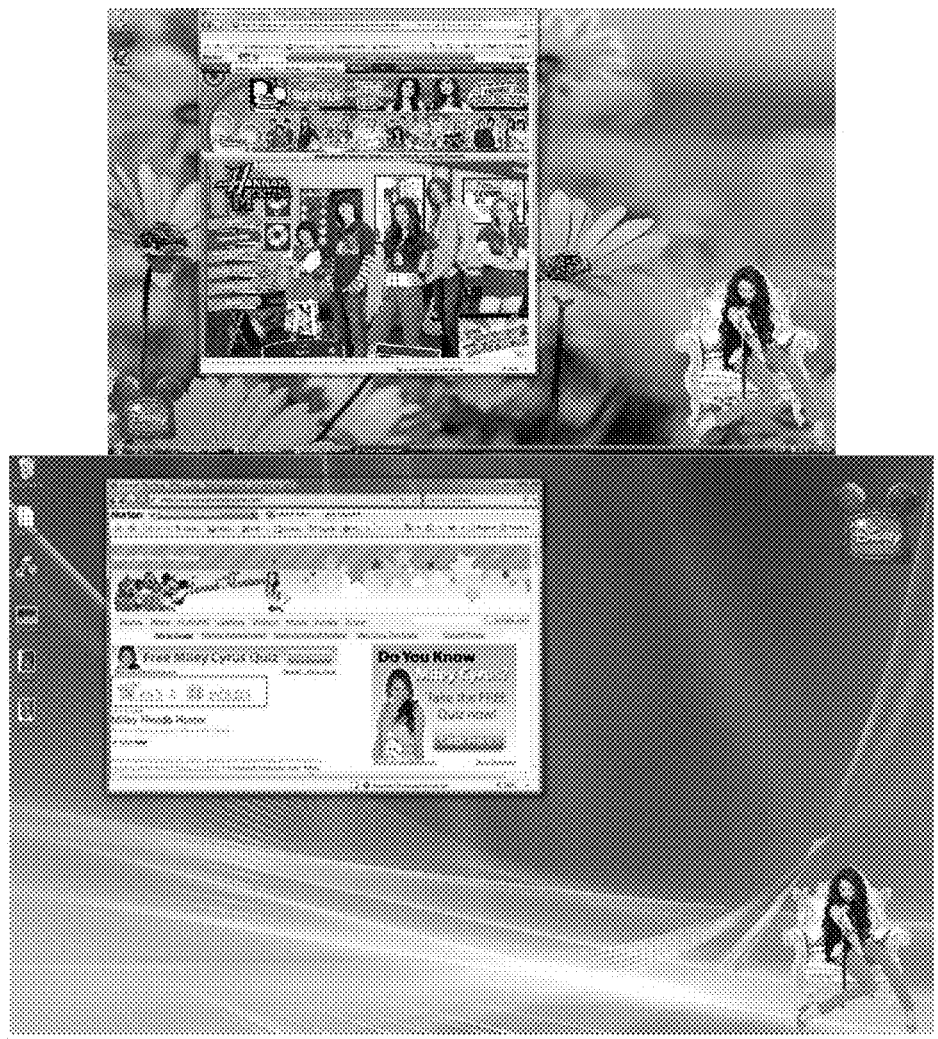
FIG. 7 is a fictional example of a FAVO of Miley Cyrus as Hannah Montana moving from within the border of the browser display onto the device's operating system display.
Figure 8:
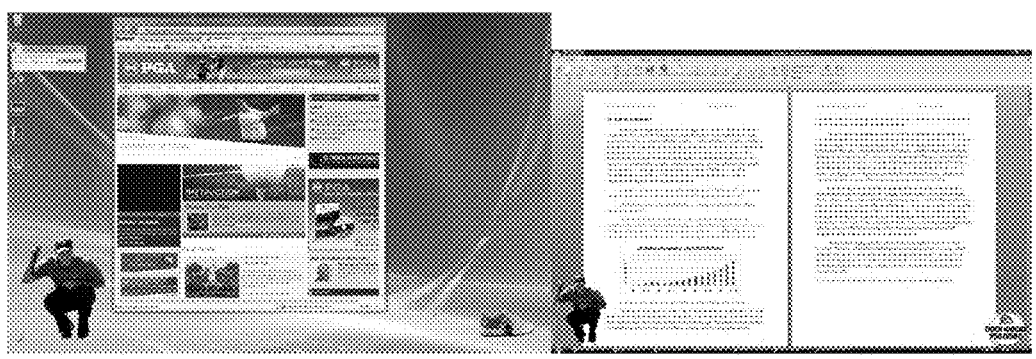
FIG. 8 is a fictional example featuring Tiger Woods sponsored by Nike.
Figure 9:
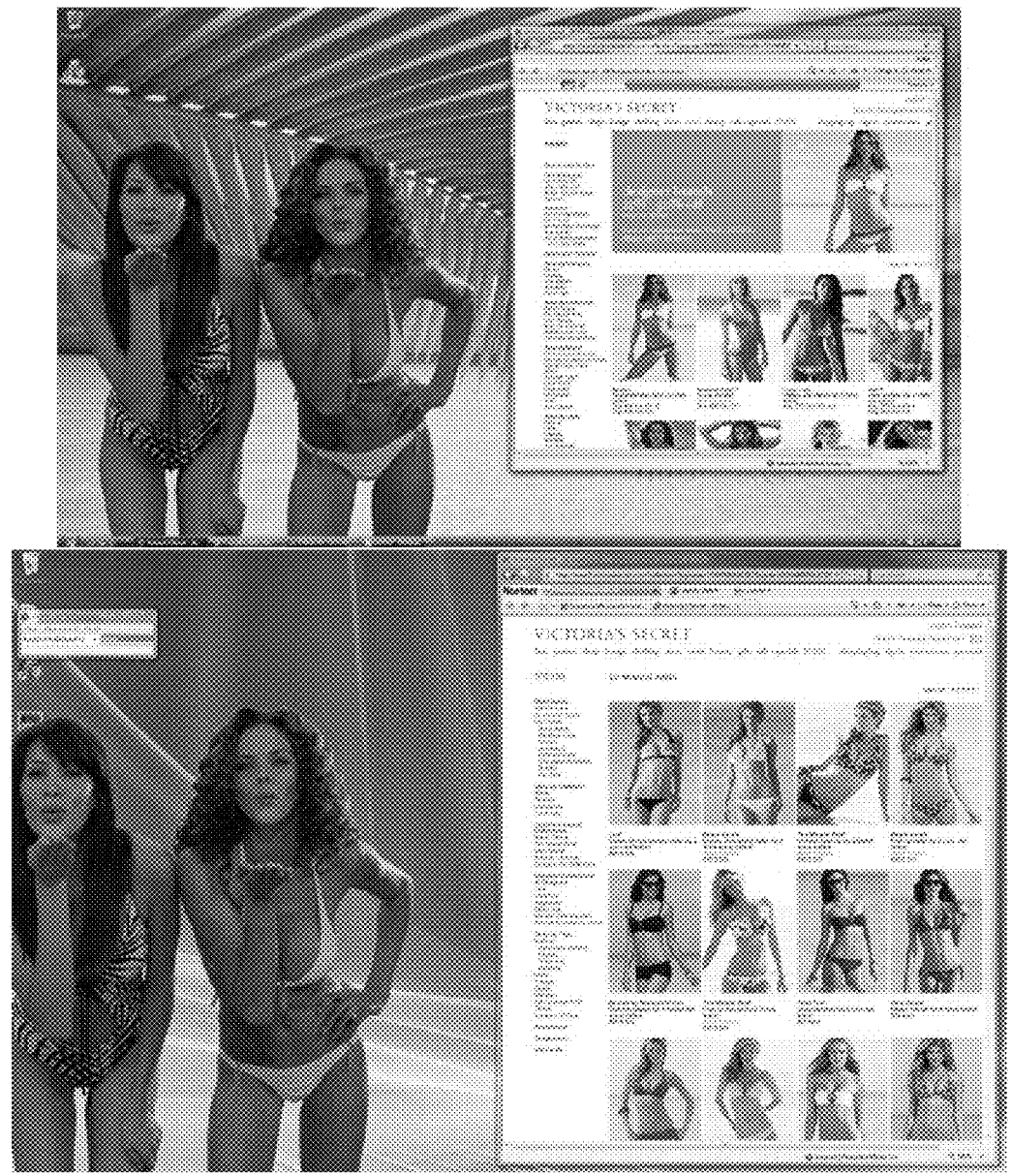
FIG. 9 is a fictional example of large format FAVO promoting the Victoria's Secret swimwear line.
Figure 10:
FIG. 10 is a fictional example of a two flower FAVO.

FIG. 6 is a flow chart example of the production process. A FAVO is made up of individual frames of content. These frames are exactly the same as a movie frame. The frame has transparent regions that become invisible or partially so. This gives the illusion that the FAVO Content is not surrounded by a border. Rather it is a free-form organic shape. To achieve this effect using real world objects the item/person is filmed against a 'green screen' FIG. 6 # 600-601. Then after filming the subject matter is isolated from the filmed background via giving every other pixel the transparent color code FIG. 6 # 603-604. If semi-transparency is desired an alpha-channel is used on the desired pixels to give a see-through effect. After each frame is processed during this post-production process they are grouped together to form a scene FIG. 6 # 605. This flip-book animation is the basis of all moving pictures that form the basis of modern cinema. With as little as 10 frames per second the illusion of a real world scene can be achieved. After the scenes are processed the scene content is further processed to achieve the FAVO objects FIG. 6 # 606-607.

The Portal provides clients with live and detailed reports on end-user activity such as impression count, click-through count/rate, total engagement time, end-user settings, favorite FAVO, and playback frequency. The reporting can be customized and expanded to handle the specific metric needs of individual clients.

The Value Proposition

The solution is a new ad format, delivery and tracking system. What we are offering is borderless video messages that live beyond a single web page, web browser or display frame of any software application. Rather than having a marketing message locked into a single application window, the product creates a direct pipeline to the consumer. This pipeline allows the sponsors to strengthen their connection to their customers while providing exciting content, news flashes, promotional discounts and a living icon that can drive traffic to their web pages.

The sponsors' challenge is to integrate the marketing message within the content in such a way as to entertain and not annoy the end-user. Once this challenge is overcome, the end-user will spend many minutes—if not hours, days or months—willingly interacting with and being influenced by the marketing campaign.

Because the FAVO are opted-in by the end-users, they are inherently more efficient than online video ads in a browser including overlays. As a result, we believe FAVO deserve to be priced at a premium relative to existing online video solutions. However, we believe the business model is profitable at or under the rate offered by current online video solutions.

Key Benefits of the Technology

In summary, the technology offers key competitive characteristics relative to other online video advertising solutions:

Embedded e-commerce. A FAVO allows a direct link through itself, or a pointed to object, etc., to enable purchasing objects or viewing a catalog or other e-commerce activities, including bookmarking, filtering, indexing, etc.

High Definition. The format has been designed for high definition video. We believe high definition is a key element for objects to look as living as possible and for the end-user to enjoy the experience.

Frameless. The FAVO are free of any border or window and generally take the form of real world objects. These natural, organically-shaped objects resonate with the human eyes and brain, helping to humanize the computing experience.

Outside of a single web page or the web browser. As opposed to traditional video ads that are played from web pages, the FAVO are played outside of a browser: they are played on the top layer of the operating system and are therefore viewable by the end-user while working with other applications. The FAVO can be used as software companions for the end-users.

Interactive, capable of multiple hot spots. Mouse clicking on a FAVO can initiate any programmable action, and at certain key points in a FAVO, the video can be mapped to include multiple clickable hotspots.

Light CPU usage and ease of download. By requiring limited CPU usage, the Client Module and DSDMS can be run without slowing down the end-user's system and therefore can be enjoyed by the end-user while using many other applications. The installation of the Player is fast and user-friendly.

Flexible content management. Sponsors fully control how long FAVO can stay on the end-user's computer. In addition, advertisers can add additional FAVO to deliver more content for a particular campaign.

Non-intrusive. The end-user fully controls which campaign to receive and which particular FAVO to replay. It is not the intention to force content that is not expressly accepted by the end-user. In addition, the end-user also controls the position of the FAVO on the screen, their opacity, size and volume.

Extended-stay. In one embodiment the FAVO are saved on the end-user's system hard drive and therefore can be replayed as many times as desired by the end-user whether or not connected to the internet. The combined effects of "extended-stay" and "non-intrusion" will result in multiple ad impressions for each FAVO video.

Selected End Segments and Applications

Examples of types of promotions include the following:

Promotion of pop stars and entertainers;

Promotion of products and services by celebrities;

Promotion of sports organizations by sports stars;

Interactive advertising for fashion retailers;

Promotion of destination hotels and resorts;

Promotion of movies/TV shows and their corresponding DVD and Blue-ray discs;

Promotion of video games and their expansion packs and merchandise; and

Simple visual "eye candy" such as retailer sponsored "flower of the month" or "kitten of the day".

Other applications of the technology include:

Political idea dissemination and fund-raising where the politician is the FAVO;

Children's educational tutorials with the FAVO as the teacher;

Interactive counterpart to children's toys with the FAVO being a digital replica of the toy;

Entertainment where the FAVO is the stand alone star of its own show;

Weather reports, news flashes and chronicles;

Special event messaging (such as greeting cards) for which consumers will be able to create their own FAVO;

Next generation portals presented by FAVO anchors;

Next generation online shopping tool where the consumer purchases directly from the FAVO;

Customer service such as FAQ or tutorials presented by FAVO;

Applications for mobile devices and set-top boxes; and

Next generation instant social networking or social-blogging where the FAVO is the message.

The following is a description of how the solution is compelling for select targeted advertisement end markets. These specific examples are fictional, and are intended to illustrate general customer applications, and to clarify how the solution is utilized in the real world.

Pop Stars and Entertainers

Promoting popular stars and entertainers is a natural fit for the solution. These celebrities have huge fan bases, an established media/web presence, existing sponsors and their own product lines. Most importantly they are audio-visually appealing. Popular musicians are ideal candidates as they can dance, sing and speak well. These all happen to be great qualities for a software companion.

FIG. 4 is a fictional example centers of Miley Cyrus as Hannah Montana bursts out promoting her latest song. A Hannah Montana FAVO could interact with fans in a number of enjoyable ways. She could speak to her fans in person, engaging them and making them feel like they have a personal relationship with Hannah. This is a potent desire of fans, especially in the age group that Hannah targets. This will significantly add to the "stickiness" and longevity of her screen top residency. She can live on the desktop or offer a continual presence by floating on top of the web browser as her fans bounce from web page to web page.

Hannah could sing and dance while she promotes her new songs, albums or concerts. She would also be able to promote her many associated products directly by speaking about them, indirectly by wearing them and/or using them as props in any of her daily updatable scenes.

Hannah is associated with a large number of products. She has her own clothing line called Asda Clothing and is also in partnership with Disney and Wal-Mart. Wal-Mart sells over 140 Hannah Montana products. A Hannah Montana FAVO would be an ideal way for advertisers to promote these products. In addition, Hannah Montana might promote new episodes of her TV show, other Disney performers, products or events.

Hannah's enterprise and associated sponsors would derive significant benefits from the Hannah Montana FAVO. Aside from the product advertising and show/event notifications mentioned above, the FAVO would increase Hannah Montana's branding. Hannah Montana's fan demographics (teen and pre-teen girls) are apt to download and share computer content. As a result, we believe that a Hannah Montana FAVO campaign could quickly spread out on desktops around the world.

Due to the size of Hannah Montana's fan club, we anticipate first end-users of these FAVO to share them with friends ensuring a faster dissemination of the campaign. In one embodiment, pop-up menus are provided on the FAVO itself, or menu items are provided in the Player that would launch a form.

to send emails
post to web sites or web pages
link to social networks

In one embodiment, code can be pasted into a website or webpage to enable permanent FAVO insertion into that web site. An embodiment supports drag-n-drop to websites or web pages. This is insert code that will remain a permanent part of said web site or web page. An embodiment utilizes said websites existing widget code pasting procedures. An embodiment supports inserting multiple FAVO into said websites or web pages The end-user will be able to manage the properties and settings of how FAVOs play and exist on the web page that the FAVO has been inserted into. The end-user will be able to control the deletion, frequency of play, order of play, position on the screen, opacity level, number, size and volume of the FAVO.

Another embodiment allows the sponsor to reward—according to the sponsors' desires—the end user if another end user grabs the FAVO and puts it on a different website. The said rewards may be based on any tracked EUI on said different website. Furthermore, if yet a different end user grabs the FAVO and puts it on a different website each end user in the sequence of FAVO sharing end users may be rewarded by the sponsor. This describes a multi-level hierarchy of sharing and rewarded end users. This can be tracked by giving an end user that share FAVO's a unique sharing ID. This data can be used by the DSDMS to track multiple successive layers of sharing and reward these FAVO sharing end users according the sponsors desires.

All of the above applications support optional downloading or instantiating of the Client Module to enable FAVO persistence that is independent of software application display frames.

Sports Stars and Sports Organizations

Sport stars are also ideal candidates for a FAVO ad campaign. Reasons include: (i) huge fan bases, (ii) constantly changing statistics that can be presented to those attentive fans, (iii) existing endorsement contracts that can be cross-market opportunities, (iv) organizational structures like the MBA, NBA, NFL, NHL and PGA that will sponsor the stars as they promote their sports and branded merchandising.

FIG. 5 is a fictional example featuring Tiger Woods sponsored by Nike. With fans throughout the world, a wide mix of high value advertisers, and interesting content, Tiger Woods FAVO would be widely welcomed. He would also be an effective way to brand and drive direct sales. Campaigns could be anchored by any of his numerous sponsors (Nike, EA Sports, Buick, Accenture, Titleist, American Express, Gillette) or by a sport organization such as the PGA, or by any combination of the above.

Imagine if Nike was the lead sponsor for the marketing campaign. In conjunction with the clients we could produce scenes with Tiger wearing a Nike hat and his new signature Nike golf shoes while he is driving, putting, inspecting the putt, etc. These could be (or not depending on sponsor preference) interspersed with associated direct advertisement such as the shoe alone appearing briefly on the screen. Click on the shoe and it takes you to the Nike webpage highlighting the same shoe. This type of directed traffic makes it easy for an end-user to get more information or purchase any item that catches his eye.

The FAVO can link to information about Tiger, or simply display it. For example, current score and standing in an ongoing tournament, his schedule for the next month, etc. A pop-up of his current score could occur after every hole during a tournament. This can be accomplished by linking with sites that provide real-time sports updates.

This is but one of many possible campaign concepts. Tiger Woods as a FAVO could easily perform spokesperson activities for organizations such as the PGA, providing key information to willing fans. Golfers, aside from simply liking Tiger Woods and enjoying his presence as a software companion, might also enjoy studying his various golf strokes. A detailed Tiger Woods sponsored golf lesson of the day is yet another angle that would be well received.

Fashion Retailers

The technology is particularly well-suited to specialized retailers. Some of the most potent retailing applications are in the world of fashion. In this case the model wearing the clothing is both the content and the advertisement. Although this can also occur with sports and pop stars, those types of campaign will most likely be sponsored by a corporate brand. With a fashion marketing campaign we can achieve a true synergy of advertising and entertainment or as we like to call it, "advertainment".

FIG. 6 is a fictional example of large format FAVO promoting the Victoria's Secret swimwear line. With its potent fusing of advertisement and compelling content, a campaign for Victoria's Secret is particularly attractive to two types of users: "catalog users" and "eye candy users".

The "catalog user" is presented with a new and superior way to view merchandise.

Using the technology, a user will be able to see what the product looks like from multiple angles in an exciting "living" way. Imagine Victoria's Secret models doing catwalks on the screen, showcasing clothes and performing. Changes in size and direction, 360° views and all the excitement models bring to the catwalk can be emulated with this approach.

Users could choose to view the catalog full screen as a stand-alone show, or the show could be played in a smaller, less intrusive manner. This small sideshow is particularly interesting because it allows for "simultaneous viewing". Unlike browser experiences, which tend to take up valuable screen real estate and interfere with other activities, the FAVO presentation takes place as one continues his normal workflow on the computer.

For example, an office employee could have the FAVO play in bottom corner as he or she continues to work. If he or she sees something of interest on the FAVO, he or she could then click on it and be taken to the Victoria's Secret Website to learn more. If not, he or she could continue on with his or her work. The FAVO catalog is a new, innovative and superior form of web-powered catalog.

The other type of user is the "eye candy user". Many users, both men and women, will be interested in the Victoria's Secret FAVO simply for the visual, "eye candy" experience. Beautiful models strutting on the screen showing off bathing suits and lingerie is a compelling experience. Beautiful women with fresh and varied content will stimulate end-users worldwide to eagerly download and continue to update these free "living" Victoria's Secret models.

We also expect that this type of user will let their friends know about these free downloads and add to the viral marketing power of these FAVO. We anticipate that this type of "eye candy" has the potential to become a permanent fixture of the computing experience.

The benefits for Victoria's Secret are many: increased catalog usage and distribution, enhanced branding and recognition, and increased sales. The FAVO marketing tool is an ideal enhancement to Victoria's Secret's existing advertising campaign strategy.

Product Promotion and E-Commerce

Our technology can also be used for product-centered campaigns that do not require a human experience. These non-human yet visually pleasing FAVO are well suited for our optional embedded e-commerce capabilities. This innovation empowers an end-user to purchase an item displayed as a FAVO with a simple mouse click, thereby bypassing the need to surf to a retailer's website; or as we like to say, "See it, Click it, Own it!"™

The next fictional example revolves round 1800FLOWERS.COM.

This example illustrates how our FAVO can be attractive, entertaining, interactive and valuable for end-users, who will therefore choose to download our technology and to receive new campaigns. With flower FAVO, end-users can replicate on their computer desktop the decoration elements they are already used to have in their office or home. Flower FAVO are entertaining as they can move, bloom or be static and can be changed as often as desired. They are interactive as end-users can choose the flowers they want to see, make them transparent, increase or decrease their size or have as many flower FAVO as they would like. Flower FAVO also represent a valuable content as end-users can learn flowers' name, history, geographic origin, season just through a simple click.

For 1800FLOWERS.COM flower FAVO represent an efficient advertising, promotion and e-commerce engine. As discussed previously, clicks on flower FAVO can drive web traffic on 1800FLOWERS.COM. In addition, our FAVO can integrate an embedded e-commerce engine that would bypass the advertiser's website. After an initial purchase or sign-in that would record end-users' data (payment information, address, etc.) this new e-commerce engine will enable the end-user to make seamless, integrated purchases. Simplifying the buying process will foster commerce and especially increase the likelihood of impulsive shopping.

By providing fresh digital flowers on a daily basis, 1800FLOWERS.COM exchanges gorgeous eye candy for a valuable direct pipeline to its customer base that can communicate promotions and news in a timely and very direct manner. 1800FLOWERS.COM would also use a FAVO billboard software object that would present its regular customers with discounts, reward points and/or other promotions. Now promotions are lively and provided in an innovative, entertaining and engaging way.

Various embodiments include a highly scalable, redundant and secure server solution to serve (i) the information collected by the DSDMS from the Client Modules across the end-user base and (ii) the reports sent by the DSDMS to the Sponsor/Portals across the customer base. This ensures the scalability and reliability of the information as the data collected.

Another embodiment provides an automated digital content production pipeline: a new suite of software designed to further enhance the creation process of the FAVO from the production through the post-production processes. The core element of the digital content production pipeline automatically removes the green background and generates the frameless object instantly. This provides immediate feedback to production teams on-set therefore reducing filming sessions and interaction with post-production. In addition, editing tools and modules for the digital content production pipeline further reduce the lead time for post-production.

In one embodiment the Client Module supports other platforms including Apple Mac OSX. The Client Module's features set can be expanded based on end-user and client feedback.

One embodiment provides a third-party monitoring and verification system that further strengthens the credibility within the client base.

Re-usable code modules are specifically designed for clients in the same vertical in order to leverage the sales and marketing effort. For example, modules for the promotion of movies include pre-built code for finding local theater times and to purchase tickets directly from the Client Module and are able to be re-used for other customers in the same vertical.

As discussed above on pages 22-23, the software is integrated with the various popular social networks. This makes it very easy for the end-users to place a FAVO on their social network web page and therefore share it with all their friends. As a result, this will accelerate the diffusion of a campaign.

End-users can generate their own content. This Web 2.0 initiative hinges on the image display software object and the development of an automated image background removal tool. This automated tool is based upon the digital content production pipeline. This digital pipeline allows a FAVO to be generated in real time. With such a capability, "end-user as FAVO" based greetings can be shared amongst loved ones. Imagine having your very own children as desktop based software companions. This innovative messaging software will take the form of a web page-based tool where end-users can make and send FAVOs of themselves via their home computers and video cameras. A potential clicks-and-mortar enhancement would be to create a kiosk positioned in shopping malls or areas where consumers congregate. This would be for convenience and higher quality imagery.

The Client Module will also function on mobile devices and set top boxes. Currently television stations run FAVO's on top of a program that is being shown on a particular station to promote their sponsors or other television programs. This trend has occurred to counter act the fact that programs are often recorded and conventional commercials can be avoided by fast forwarding past them. However these broadcasted FAVO's are similar to embedded on a web page. For example, when an end user leaves a particular web page all of the content—including FAVO—disappears to reveal the content of the next web page; in the same fashion when a viewer changes the channel the content—including FAVO—disappears to reveal the program that is broadcast on the new station. In contrast, in the present invention the FAVO will float on top of the television display—powered by our Client Module—and remain visible regardless of what station is on. This empowers end users to choose their content and if desired they can drag the FAVO to a position on the screen that will visually obscure the FAVO being broadcasted by the current channel. One way to describe this is a frameless picture-in-picture.

One embodiment provides special effects such as morphing, looping and branching of images to increase user interaction with the FAVO.

In other embodiments, the FAVO can be integrated with other technology. For example, the FAVO could be an image of the end user, with the end-user's dimensions, to allow modeling of how clothes would look on the end user. One example of an implementation is set forth in U.S. Pat. No. 7,522,165. A FAVO on a mobile device can use location based ad and coupon technology (see, e.g., U.S. Pat. No. 6,647,257).

User Interactions

EUI: End user interaction. A subset of possible EUI include clicking on any part of the FAVO, clicking on a particular part of the FAVO, or a user voice command. The interaction between a device can occur in many different ways. As devices evolve additional EUI may become possible. Here is a list of current standard EUI:
   Key board events
   Mouse events. For example:
      Click
      Double click
      Roll over
   Touch events
   Voice events
   Movement of the device events
   All of these events cause the device to initiate some form of software code that can launch a software or hardware event. Sometimes a EUI initiated in a 3rd party software application will activate a FAVO not directly associated with said application. Primarily we will focus on EUI dealing specifically with FAVOs.

The Client Module has the ability to track any EUI. The Client Module will interact with the web browser API to register interesting activities. Tracking is done of time spent with FAVO where the FAVO is the software application that is active and in focus. Determined by several factors including but not limited to
   Clicking
   Menu selection
   Property setting
   Commerce states
      Window shopping
      Actually purchasing
   Portal activity where the FAVO is the launch point to any form of application
   End user determined favorable or unfavorable FAVO status
The EUI information is stored within the Client Module and optionally in the DSDMS
Additional FAVO Features The FAVO can appear to move from the computer to the phone. In one embodiment, this is done with separate, synched applications on each, so the model is wearing the same outfit when the user goes to lunch and checks his/her phone. One option is for the FAVO to hop back and forth between devices where the user is using both devices.

Transferring FAVO

To and from software applications [note: the operating system of a device is also a software app.]
   Application to OS: Here we are talking about the FAVO moving its' residency from an application to the home page/desktop of the devices operating system.
      Downloading FAVO content to the OS
   OS to application:
      Uploading content to an application
   Non-OS application To/From Non-OS application
      Here the FAVO moves between and integrates with another software application.
         As mentioned above from one end user social network web page to another end users social network page.
To and from different end user devices.
Personal computer to personal computer
Handheld device to handheld device
   Cell phone to IPod, etc.
Personal computer to handheld
   Vice versa.
Examples of user options for when the FAVO appears:
On system start up
On application minimization
On application close
On EUI that launches FAVO
   Desktop icon
   Tray icon
   Application launch window icon
   Home screen icon
On voice command In one embodiment, the FAVO detect when the user is busy and shrink to the corner. In another, it will enlarge to full screen when the user clicks on it. The software can detect where windows are open, and move the FAVO to the side of these. It can either get out of the way, or move into the user's peripheral vision. The FAVO can freeze when moused over, to make it easier for the user to click hotspots. A user can select different FAVOs for different categories, and link them to different appearance schedules. For example:
   celebrities could appear when the browser is active,
   an investment advisor FAVO with financial ads could appear when the user is on the Schwab.com site, etc.

Day in the Life of the Desktop Doctor (DTD)

This DTD application is useful in demonstrating the FAVO role as cyber expert. Basically, the DTD solution provides a direct pipeline to each end user [the Patient] and is designed to help these Patients maintain the correct procedures in administrating their medications. After addressing this core solution the DTD allows pharmaceutical companies [the Client] to directly market other goods and services to these Patients.
   Background Info
   Certain medications currently come with video and literature based guides and tutorials.
      Our FAVO solution extends these guides by integrating into the fabric of the Patient's life; a life that is increasingly intertwined with visual displays of digital devices.
   Our unique type of cyber tutorial will be compliant and integrated into the FDA'S REMS (Risk Evaluation and Mitigation Strategy) requirements.

The FAVO based form factor has many advantages in relation to traditional tutorials that can be leveraged by our Clients.
One key advantage is that an actual doctor appears to be living in the Patients device:
  A great deal of the healing power comes from the Patients' belief the wisdom and capability of the health practitioner.
  Adding a simulated human element to the health equation will stimulate this belief process.
  With the DTD solution the digital device appears to have a resident medical doctor;
    A doctor that guides and reminds and safeguards the Patient.
Another advantage is that the software will require very little computer experience beyond inserting the install disk and/or clicking a download button.
  Many of the Patients using the DTD will be elderly and/or not that comfortable with digital devices.
  Bullet-proof easy to run software will help to bridge this gap.
  Although essentially a self-running software application the DTD has several options and features that can be explored by the Patient to further enhance their experience.
In summary, the DTD solution will be a great addition to any Patients' health regimen by providing a virtual health professional that is integrated into the Patients' lifestyle.
Initial Download/Install
The software will be both disk-based and/or downloadable via the web
  A disk version may come from:
    the prescribing physician
    the Client
    the pharmacy/drug store
  Web download
    Where will the Patient first see the DTD
      Clients' web site
      Banner ad
      Email
  Download experience
    Where ever the Patient first encounters the DTD what they will experience the content as a web overlay based FAVO.
    It may begin as a standard banner ad where a doctor steps beyond the confines of the banner ad unit.
      As a banner based FAVO the audio will most likely be muted until an EUI turns the audio on
    It may appear as an overlay immediately once the web page is loaded.
    It may launch as soon as an email is opened.
      In this case it will appear as a FAVO based doctor floating on top of the email application; which is a unique and catchy way to grab an end user attention
    In most cases the FAVO will be supported by standard text informing the Patient to click some object or the FAVO itself to get more information.
    The FAVO will then employ life-like verbal and body language to explain the value of the DTD while encouraging these Patients to download the software onto their operating system
    Once the Patient agrees via any form of EUI the FAVO will step or move beyond the browser or email application and appear to move onto the OS desktop or float on top of other applications
      This may require a partial or total minimizing of the browser or app that launched the initial encounter
    Moving beyond the application window will provide the illusion that the DTD is now living within the digital device and is no longer just something on a web page.
      This will effect will really be brought home once the Patient leaves the web page to discover the DTD is still present.
    While the Player application is being loaded onto the OS the Patient will be receiving seamless FAVO content.
      They won't be waiting for the application to load in order to be experiencing content
      This streaming of instantaneous content will be handled by our $3^{rd}$ party content delivery partner and will eliminate needless waiting to receive audio visual content.
Once the DTD solution is installed on the Patients digital device that device will have the necessary software to receive any form of Avazaps' FAVO content initiatives without the end user needing to install any more software.
  This supports Avazaps' goal of getting the core FAVO software on as many devices as possible.
  This allows the Customer to participate in Avazaps' other Customers FAVO initiatives.
    Once a Customer DTD base of installed Patients grows to a significant number, And . . .
    Once enough metrics have been generated to prove that a significant number of Patients are interacting with the software, Then . . .
    The Customer via Avazap technology is delivering a highly focused form of new media.
    This media has a content queue with many daily slots of messages.
    The Customer can make some of these slots available to $3^{rd}$ party marketers.
    The marketers can simply purchase message queue slots. Or . . .
    The Customer can take advantage of Avazaps' auction based FAVO content engine and allow these $3^{rd}$ party marketers to bid on open slots.
    The Customer can also take advantage of the Patients demographic data to offer the $3^{rd}$ party marketers a deeper level of targeting sophistication.
Day in the Life
When the Patient first encounters any of their DTD enabled devices the DTD will be waiting with its first message for the Patient.
  The playback of this message can be initiated in several ways;
    Set to automatically play once a device is:
      turned on
      Idle for x number of minutes
    Activated by the Patient clicking on the DTD
      The DTD can be floating on top of other applications or just floating on the desktop for this case.
    Activated by clicking a FAVO based icon
      Here the icon that used to launch applications in virtually every digital device that has a display have been replaced by a moving—living FAVO icon.
        This will require integrating with the API handling icon behavior for each OS.

Alternatively, the OS specific icon behavior can be mimicked to simulate standard icon protocol. This icon mode further enhances the idea that the DTD lives within the device Here's a list of possible daily messages appropriate for the Patient first encounter with DTD
  These core messages will have many variations that will be repeated randomly in order to be more life-like and less boring.
  Always starting with a Customer logo/jingle
    This promotes brand building
    Various permutations on the logo representation will enhance the visual appeal of this—somewhat gratuitous—form of advertisement
  Take your pill reminder:
    The core and potentially life-saving message.
  Greetings
    Relative to the time of day
    Holiday special greetings
    Birthday greetings
  Any updates from the Customer
    Possible alerts or new found contra-indications
    These may be delivered via a web powered billboard-style application.
      This billboard will take advantage of the free-form FAVO capabilities.
  Healthy life-style/positive affirmations
  At some point during these messages the Customer logo will simultaneously appear as an additional FAVO
    This multiple FAVOs appearing on the display at one time technique will enhance the Customer branding goals.
    Often times this logo will be animated in rotating fashion to enhance the sense of depth and to provide the illusion that brand is also living within the computer.
    This logo messages serve the dual purpose of branding and of being a direct portal to the Customer web site.
      Any form of EUI could be harnessed to launch the Customer web site.
  Marketing messages
    Customer offerings.
    3$^{rd}$ party offerings.
Targeted Messages
  Custom tailored based on Patients health profile
    The Patient will fill out a digital form listing medical conditions, concerns, health/fitness goals etc.
  Custom tailored by Patients computer activity
    The DTD Player will monitor all EUI with between Patient and the DTD
    The DTD Player will monitor the Patients' web browsing activity
      This will be an opt in feature
  The DSDMS will store this data by Patient ID and will utilize the information to perform algorithms that will be aimed to present more targeted messages to each individual Patient.
At this point—or on any occasion—the Patient may choose to perform a EUI directly with the FAVO DTD or the Patient Options screen of the Player application. Each Patient can interact with the DTD according to their unique needs and interests. There is no set way to spend time with the DTD. The patient experience is non-linear and totally customizable. [Note: the "Take your pill reminder" message will be a non-optional feature in that this core capability helps to directly enforce a Patients' dosage requirement.]
  To check on any contra-indications brought about by a new medicine that another doctor had prescribed.
    Access the FAVO based FAQ concerning the medication.
  Go to relevant web site via FAVO.
    Such as the Customer home page.
  Blogging directly via the form that is launched from the FAVO and/or the Player application.
    The blogging feature will be accessible to both our Customer and other Patients.
      The Customer will have the ability to filter and screen these blog posts in an effort to limit negative feedback
  Changing the doctor
    The DTD will be comprised of several doctors that will deliver the same content but;
      Multiple genders
      Different outfits
      Different bedside manner
      Nurse mode
  Changing the audio visual playback modes of the doctor
    Float on top of other applications (Y/N)
    Float on top of desktop (Y/N)
    FAVO icon mode (Y/N)
    Enlarge and center on activation (Y/N)
    Shrink and retreat on idle (Y/N)
    Opacity level
    3D (Y/N)
      This novel mode requires of special filming techniques and presently requires special glasses . . . but it really strengthens the illusion that the doctor is alive as your health care companion.
    Full screen background on activation (Y/N)
      With this mode the DTD is now surrounded by a background image such as a room in a hospital or a lecture hall as soon as the Patient interacts with DTD
  Access the healthy life style/positive affirmation FAVO mode
    Here healing and generally uplifting messages will be delivered
  Send To Friend
  Post to Social Net/Web Page
After any FAVO Message is Delivered and/or any EUI Performed the FAVO Will Communicate the Details to the DSDMS.
  All of the Patients' DTD enabled devices are linked to the DSDMS via the Patients' unique ID code.
  This device independent tracking logic allows for a continuous experience across all devices.
  The next display [computer, set-top, net-linked appliance—such as alarm clock, mobile phone, etc.] that the end user encounters will be poised with the next daily message in the DTD content queue.
  If the Patient accesses the DTD via their cell phone earlier during the day, then when they sit down to enjoy television via their set top box powered living room display the DTD will be primed and ready to send the next appropriate message
  To the Patient it will seem as if his experience simply extends transparently from one device to another.
  This demonstrates that the DSDMS manages content across various screen enabled devices.
Another Feature Will be Medication Prescription Renewal.

This takes advantage of the DTD's embedded e-commerce engine.
- This service stores shipping and credit card info to make prescription renewal as painless as possible for the Patient.
  - The Patient also has the option of going to the Customer medication distribution web site.
  - Or, placing an electronic order at the Patients local pharmacy.
- The Patient will also be able to examine the Customer catalog of other suitable medical solutions.
  - In order to educate the Patient and to prepare the Patient with the relevant questions to ask to their real world health professional.
- Avazap will generate commission based on these prescription renewal orders.

The Client Will be Able to Add New Content to the DSDMS
- First they must post the new content with their Avazap account manager.
- The account manager will then upload this to our content delivery network.
- The Customer content creation efforts will benefit from our automated digital FAVO production pipeline.

At any Point the Client Will be Able to Access the Scope of the Campaign Via the Web-Based Dashboard Reporting Tool
- The metrics will be tailored for each individual client.
- But will most likely include:
  - Install base data.
  - Content impressions.
  - E-commerce data.

Avazap Will Receive Revenue in Several Different Ways:
- Charge per individual installs.
- Monthly subscription fees.
- Content updates.
- Report Generation
- Prescription renewal commission.
- Third party advertisement
  - CPM.
  - Click-through.
  - Action-based commissions.

List of FAVO Features.
- Desktop/Operating system home page screen FAVO
- Multiple FAVOs on screen display
- Rotating FAVO based content
- Display centering of FAVO
- Shrink & corner when idle
- FAVO based email
- 3-D FAVO
- Holographic/Outside of device display FAVO
- Streaming capability
- Transferring FAVO
- FAVO based Advertisement
- Ad Campaign Monitoring System (ACMS):
- EUI-based FAVO content modification: here we are talking only about what an end user is doing with content sent from the ACMS.
- DSDMS is analyzed across all of clients various FAVO ad campaigns:
- Allowing end users to receive campaigns from multiple clients. For example:
- Placement in the FAVO content queue of an end user can be bid upon by advertising clients to achieve the desired frequency or exact placement in the said queue.
- FAVOs used to collect user information:
- Information can be gathered via EUI
- Indirectly via reading accessible data on client device/OS
- Declining Cost Per Ad Impression System:
- Hotspots
- Hotspot EUI Events
- Area surrounding FAVO as hotspot
- Hotspots trigger scenes
- FAVO based appearance of purchasable items
- Portal
- Through EUI with FAVO the 3rd Party/Clients Web Page is Displayed
  - UGC: User generated content FAVOs (example, self, loved ones, animals, etc.)
  - FAVO Blogging
  - E-Commerce:
    - Commission generation
    - FAVO Catalog
    - Embedded FAVO purchase engine
  - 3rd party web site
  - Website/Webpage/Web Ad unit FAVO . . . here we are referring to an overlay FAVO as described above
  - FAVO makes request for the end user to allow the FAVO to become a Desktop/Operating system home page screen FAVO
  - FAVO moves out side of application window.
  - FAVO appears as an overlay then remains visible after the application that launched the FAVO is closed or minimized.
  - Automate the digital production pipeline to provide FAVO production in real time.
  - FAVO Icon [Note: second category of inventions]
  - FAVO Image Backgrounds [Note: third category of inventions]
  - FAVO launches background images that frame the FAVO which can apply to FAVO & FAVO Icons [Note: sub-inventions]
  - General Background
  - Contextual Background
- Fruit Tree
  - What Avazap is offering can be clarified with a metaphor that describes our solutions in relation to a fruit bearing tree:
  - Once an end user initially opts in to receive an Avazap ad campaign it as if they are willingly planting the seed of a fruit tree.
  - The soil of this seed is the OS of a display supporting digital device.
  - This seed generates multiple FAVO content scenes.
  - These scenes can be viewed as individual branches a growing tree.
  - Once all the FAVO scenes for a particular campaign have been downloaded this fruit tree has all of its' major branches.
  - Each and every one of these branches yields many green leaves, and quite possibly delicious and valuable fruit.
  - The leaves represent content impressions and the opening of web pages.
  - The fruit takes the form of actual commerce.
  - The Client Module stores the messages and re-cycles through this content queue after a scene has been played for first time:
    - As soon as the player enters the repeating impression mode for a particular FAVO campaign, it then becomes similar the trees many leafy and fruit bearing sub-branches.
  - As a FAVO campaign nears the end of its' life-cycle it can be viewed as the Fall & Winter; where the tree lays dormant awaiting the coming Spring This coming new Spring is associated with our client's new FAVO campaigns; for which the Player lays sleeping, waiting and ready blossom once again into beautiful and bountiful fruit tree.

Audio

In one embodiment, the FAVO object interleaves audio and video, rendering it impossible for the two types of content to become out of sync.

FAVO Campaign Monitoring

Through tracking, storing and analyzing EUI behavior the content of subsequent FAVO can be optimized for end user relevancy. For example: If an end user opts for a fashion retailer FAVO campaign and is only interested in shoes from that retailer, than subsequent content from that same retailer can consist of primarily shoes.

DSDMS is analyzed across all of clients various FAVO ad campaigns. For example: The entire history of all created FAVO and indexing based on FAVO content. Content is tagged according to descriptive criteria used to query DSDMS data base. End users can receive campaigns from multiple clients. For example: If an end user likes a wine of the month FAVO from one winery, they will probably be open to a similar FAVO from a different winery client. Placement in the FAVO content queue of an end user can be controlled. For example, imagine a FAVO campaign starring Miley Cyrus that is initially sponsored by Disney. After gaining a user base of millions of eager fans Miley might decide to open up some of the slots in her FAVO content queue to additional sponsors. These sponsors would then vie in some manner to gain a slot in the additional sponsor queue.

E-Commerce

The purchase of real world items displayed as FAVO objects is enabled. The items can be a product FAVO or an item that a FAVO is wearing/using/gesturing towards. A FAVO purchase engine is provided for enabling direct purchase upon clicking, or third party click-through can be supported. A FAVO Catalog can present multiple FAVO items for purchase. The items can be bookmarked and cached for later retrieval. The catalog supports filtering of items and go to item via indexing. The catalog can be paused, and resumed from a pause and/or a bookmark.

An embedded FAVO purchase engine will allow EUI with FAVO to launch a commerce activity. The EUI can launch an order confirmation form, can be 'skinned' to match a client's brand, and can include an ad unit.

The EUI can launch separate and possibly multiple FAVOs that represent a purchasable item on the primary FAVO. This will make it very clear to the end user what is purchasable on the FAVO. This solution can work in tandem with hot spots or stand alone. The stand alone solution addresses the difficulty in mapping each frame of the FAVO. The items in the FAVO are not stationary . . . rather; they move all about through time and space. With this technique it does not matter precisely where a particular purchasable item is within the FAVO. Rather, the EUI makes all purchasable FAVO clearly evident.

One embodiment supports pop-up menu or other forms of selection list objects or applications. Tags of the FAVO or hotspot on the FAVO become item identification codes that are used for ordering.

A FAVO can originate from an application (e.g., email), and remain after that application is closed. Alternately, the FAVO could leave the application to wander around the screen and then return to the application. For example, it could move outside of a display/banner ad and then return. The FAVO can use audio to gain attention, or gesturing at other graphics. Scenes with the FAVO can be used to gain users attention and interest.

Client Module

In one embodiment the Client Module is software application that runs on the Microsoft Windows or other operating system. Client Module consists of an executable file which can be downloaded via the internet from the AVAZAP website, customer websites and customer marketing partner sites and portals. Once installed, the Client Module will perform many functions. Here's a list of example features:

Detect user system settings such as screen resolution, CPU and RAM and set defaults most appropriate to user capabilities.

Download updates and additional scenes.

Install easily with standard desktop, menu and taskbar icons where available and desired.

Allow user to manage the properties and settings of how the FAVOs play and exist on users system. Users will be able to control the FAVO settings such as:

Sound volume, startup functionality

Frequency

Size scene selection

FAVO selection

Z-order control update functionality and criteria

Ability to integrate FAVOs with clients social networking portals such as MySpace, Face Book and others.

Set FAVO scenes to play on triggered events such as receipt of email and other notifications.

Ability to integrate FAVOs with end users personal websites.

Ability to share FAVOs/FAVO information with contacts via email.

Report user impressions, settings and usage patterns to AVAZAP'S DSDMS.

Support embedded e-commerce.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the invention art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A system comprising:
a client module for displaying a frameless object on a user computing device, said frameless object having a non-rectangular border matching the boundaries of the frameless object;
wherein said frameless object persists at least independent of any particular web page on a website;
a reporting tool for tracking appearances of said frameless object; and
said reporting tool reporting the tracked appearances of said frameless object;
wherein said frameless object includes at least one hotspot where a user can click to interact;
wherein said frameless object further includes a plurality of hotspots, with each hotspot providing an interaction on a different subject.

2. A system comprising:
a client module for displaying a frameless object on a user computing device, said frameless object having a non-rectangular border matching the boundaries of the frameless object;
wherein said frameless object persists at least independent of any particular web page on a website;
a reporting tool for tracking appearances of said frameless object; and
said reporting tool reporting the tracked appearances of said frameless object;
further comprising server module configured to track the status of message delivered to said user through said interaction using an ID unique to said user;
wherein said server module is further configured to send targeted messages based on said users health profile; and
wherein said server module is further configured to track metrics of said targeted messages.

3. A system comprising:
a client module for displaying a frameless object on a user computing device, said frameless object having a non-rectangular border matching the boundaries of the frameless object;
wherein said frameless object persists at least independent of any particular web page on a website;
a reporting tool for tracking appearances of said frameless object; and
said reporting tool reporting the tracked appearances of said frameless object;
wherein said system is configured to limit the display of ads on a website when the user is detected to have the frameless object.

4. A system comprising:
a client module for displaying a frameless video object on a user computing device, said frameless video object having a non-rectangular border matching the boundaries of the frameless object;
said frameless object appearing and persisting independent of a browser and other applications;
said client module detecting user interaction with said frameless video object;
said client module providing information associated with said frameless video object in response to said user interaction;
a tracking module for monitoring user interaction with said frameless video object;
wherein said client module further provides advertising to said user in conjunction with said user interaction
wherein said frameless object further includes a plurality of hotspots, with each hotspot providing an interaction on a different subject;
a server module configured to track the status of messages delivered to said user through said interaction using an ID unique to said user;
wherein said frameless object is selected by said user; and
wherein said frameless object is a character that has entertainment characteristics independent of said user interaction with said frameless object.

5. The system of claim 4 further comprising:
said frameless object appearing independent of a browser and other applications, and being customized for providing a reminder to a particular user.

6. The system of claim 4 wherein said frameless object is customized for a particular user to remind that user to take a drug.

7. The system of claim 4 wherein an aspect of said frameless object is selected by said user.

8. The system of claim 7 wherein said aspect is a character that has entertainment characteristics independent of said user interaction with said frameless object.

9. The system of claim 4 wherein client module is configured to track said frameless object and said user interactions with said frameless object across multiple devices.

10. The system of claim 4 further comprising a server module configured to track the status of message delivered to said user through said interaction using an ID unique to said user.

11. The system of claim 4 wherein said user computing device is a mobile device.

12. The system of claim 4 further comprising an ad module configured to alter ad content based on both user browser activity and user selection of a desired frameless object.

13. The system of claim 4 further comprising:
said client module providing for user control over aspects of the playing of said object, including at least one of deletion, frequency, order of play, play lists, position, opacity level, number, size and volume.

14. The system of claim 4 further comprising:
said client module allowing said user to provide user-generated content for said frameless object.

* * * * *